US012499196B1

(12) United States Patent
Neagle et al.

(10) Patent No.: US 12,499,196 B1
(45) Date of Patent: Dec. 16, 2025

(54) METHOD AND SYSTEM FOR VERIFYING THE IDENTITY OF A USER

(71) Applicant: Unwind, Inc., Plano, TX (US)

(72) Inventors: Brogan Neagle, Austin, TX (US); Paul Thompson, Seattle, WA (US)

(73) Assignee: Unwind, Inc., Plano, TX (US)

( * ) Notice: Subject to any disclaimer, the term of this patent is extended or adjusted under 35 U.S.C. 154(b) by 284 days.

(21) Appl. No.: 18/194,646

(22) Filed: Apr. 2, 2023

Related U.S. Application Data

(63) Continuation-in-part of application No. 16/987,627, filed on Aug. 7, 2020, now abandoned.

(51) Int. Cl.
G06F 21/32 (2013.01)
G06T 5/20 (2006.01)
G06V 40/16 (2022.01)

(52) U.S. Cl.
CPC ............... G06F 21/32 (2013.01); G06T 5/20 (2013.01); G06V 40/171 (2022.01); G06V 40/172 (2022.01)

(58) Field of Classification Search
None
See application file for complete search history.

(56) References Cited

U.S. PATENT DOCUMENTS

| 8,615,520 | B2 | 12/2013 | Fallah | |
|---|---|---|---|---|
| 10,452,897 | B1 | 10/2019 | Benkreira et al. | |
| 11,010,597 | B1 * | 5/2021 | Timoner | G07C 9/37 |
| 11,288,530 | B1 * | 3/2022 | Genner | G06F 21/32 |
| 2011/0276484 | A1 | 11/2011 | Pearson et al. | |
| 2012/0180115 | A1 | 7/2012 | Maitland | |
| 2012/0212668 | A1 | 8/2012 | Schultz et al. | |
| 2016/0125199 | A1 | 5/2016 | Lee et al. | |
| 2017/0093850 | A1 | 3/2017 | Kukreja | |
| 2018/0181795 | A1 * | 6/2018 | Nakano | G06V 40/168 |
| 2018/0181964 | A1 | 6/2018 | Zagarese et al. | |
| 2018/0189583 | A1 | 7/2018 | Wohlken et al. | |
| 2019/0014287 | A1 | 1/2019 | Katsuyama | |
| 2019/0042719 | A1 | 2/2019 | Miu | |
| 2019/0050546 | A1 * | 2/2019 | Hochrieser | G06V 40/16 |
| 2019/0172167 | A1 | 6/2019 | Scholl et al. | |
| 2019/0222891 | A1 | 7/2019 | Shen et al. | |
| 2019/0340780 | A1 | 11/2019 | Hiraide et al. | |

(Continued)

FOREIGN PATENT DOCUMENTS

| EP | 3257222 A1 | 8/2016 | |
|---|---|---|---|
| KR | 20030033266 A * | 5/2003 | ............ G16H 20/10 |
| WO | WO2016131083 A1 | 8/2016 | |

OTHER PUBLICATIONS

Webpage from https://support.coins.co.th/hc/en-us/articles/207296316-How-to-Verify-ID-and-Selfie-Verification, accessed Feb. 17, 2020, pp. 1-5.

*Primary Examiner* — Younes Naji
(74) *Attorney, Agent, or Firm* — Fulton Jeang, PLLC

(57) ABSTRACT

A system, method, and computer program product are used to verify the identity of a user implemented on a computer system. This achieved by receiving data in the form of facial images and non-facial identifying data from a user that is evaluated and verified to determine that the user is authentic and the submitted data is verified by a verification entity. The user data is also compared to preexisting data of other users so that only a single account for a user can be created.

18 Claims, 11 Drawing Sheets

(56) References Cited

U.S. PATENT DOCUMENTS

| | | | |
|---|---|---|---|
| 2020/0036714 | A1 | 1/2020 | Chen et al. |
| 2020/0042773 | A1* | 2/2020 | Benkreira ............... G06V 20/62 |
| 2020/0118368 | A1 | 4/2020 | Tagawa et al. |
| 2020/0160233 | A1 | 5/2020 | Chopra |
| 2020/0296132 | A1* | 9/2020 | Lv ...................... H04L 63/1483 |
| 2021/0001063 | A1 | 1/2021 | Benson |
| 2021/0034851 | A1 | 2/2021 | Thompson |
| 2021/0110625 | A1 | 4/2021 | Kawase |
| 2021/0216755 | A1 | 7/2021 | Wakako et al. |
| 2021/0294837 | A1 | 9/2021 | Ensing |
| 2021/0295017 | A1 | 9/2021 | Aoyagi et al. |
| 2021/0357486 | A1 | 11/2021 | Tozzi et al. |
| 2021/0406969 | A1 | 12/2021 | Sakurada et al. |
| 2022/0012473 | A1 | 1/2022 | Miyake et al. |
| 2022/0046012 | A1* | 2/2022 | Neagle ................... G06F 18/22 |
| 2022/0084320 | A1 | 3/2022 | Ito et al. |
| 2022/0117314 | A1 | 4/2022 | Daugherty et al. |
| 2022/0138298 | A1 | 5/2022 | Law et al. |
| 2022/0150286 | A1 | 5/2022 | Bünger |
| 2022/0277065 | A1 | 9/2022 | Patel et al. |
| 2022/0309808 | A1 | 9/2022 | Sawai et al. |
| 2023/0008443 | A1* | 1/2023 | Luo ............................ G06T 3/02 |
| 2023/0368502 | A1* | 11/2023 | Ranganathan ....... G06V 10/772 |
| 2024/0236415 | A1* | 7/2024 | Woodruff ............... H04N 23/23 |
| 2024/0240546 | A1* | 7/2024 | Godlewski ............. E21B 43/16 |

* cited by examiner

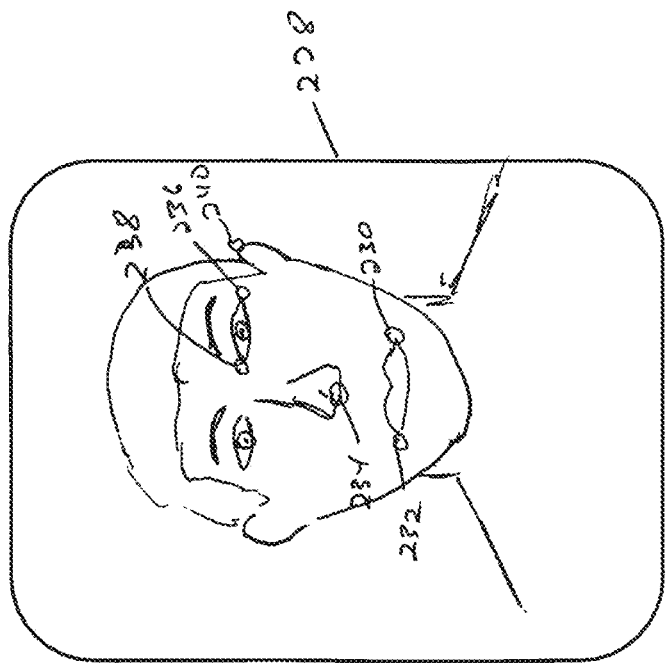
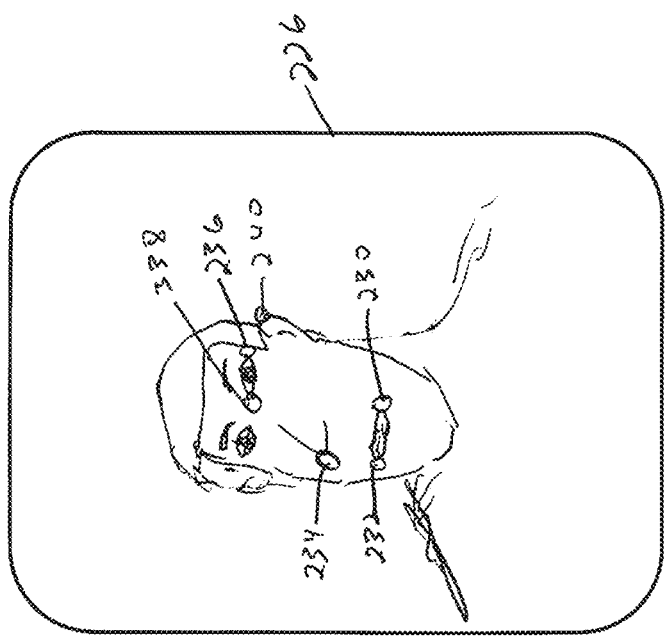
FIG. 13

METHOD AND SYSTEM FOR VERIFYING THE IDENTITY OF A USER

This application is a continuation-in-part of U.S. patent application Ser. No. 18/194,646, filed Apr. 2, 2023, which is a continuation-in-part application of U.S. patent application Ser. No. 16/987,627, filed Aug. 7, 2020, the disclosures of which are incorporated herein by reference in their entirety.

BACKGROUND

Fake online identities are a significant problem in online communities and the Internet. Misrepresentation or anonymity can lead to certain undesirable online behaviors. These may include cyberbullying, catfishing, fake consumer reviews, underage access to websites and online communities, predatory behavior, etc.

Additionally, software applications, referred to as "bots," may be used to create numerous and/or fake online personas for creating automated posts or actions that interfere or disrupt legitimate online activities. For example, bots may be used to artificially increase views, followers, likes, etc., rapidly purchase event tickets for purposes of resale, or automatically post false, inflammatory, or non-sensical content on social media platforms so that they are disrupted.

Redundancy of accounts is also a problem with many online systems. A user may have previously set up an online account or identity but may have forgotten about it or is unable to remember sufficient information that allows the user to access the account. This may result in the user having multiple accounts or identities, which can be undesirable.

Accordingly, a need exists for a user verification system that overcomes these issues and prevents untrustworthy, fake, anonymous, or redundant accounts from being created and used and links an account to a single "real" user that can be considered authentic and trustworthy.

BRIEF DESCRIPTION OF THE DRAWINGS

FIG. 13 is plan view of different images of the same individual in different orientations with key features identified as part of a normalization operation during the processing of facial image data, according to the process of FIG. 11.

DETAILED DESCRIPTION

Figure 1:
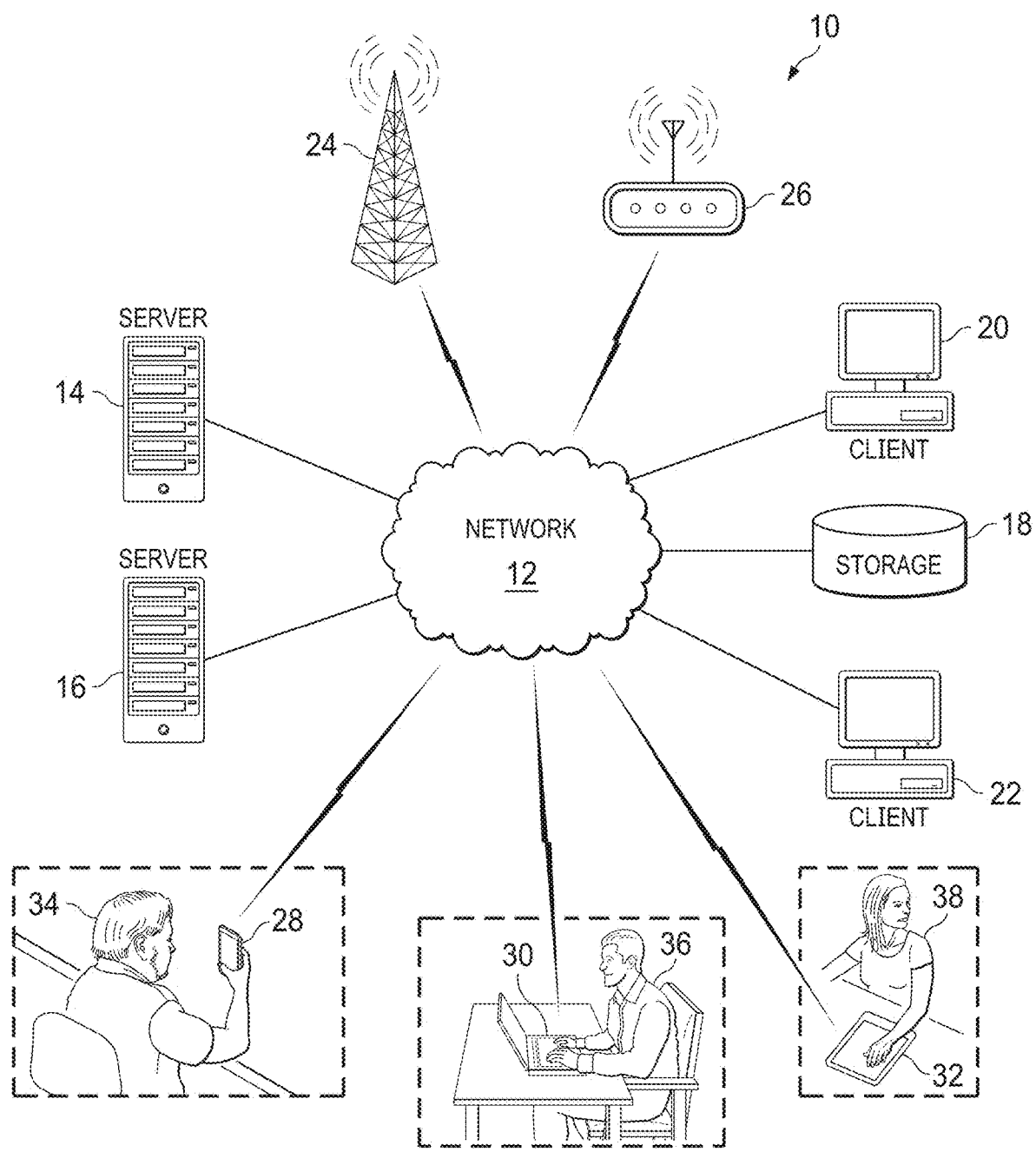
FIG. 1 is a pictorial representation of a user identity verification system in which illustrative embodiments may be implemented.

The method and system described herein is used to validate users in a digital environment. This could be in online social media where a user is required to set up an account or profile before they can engage in online social media activities. While the invention has particular application to online social media, the invention could also have application to other non-social media online activities or accounts. These may include financial or banking applications, shopping applications, medical applications, governmental applications, etc.

As discussed in the background section, current online systems do not prevent users from setting up multiple identities or accounts with fictitious or redundant information. The system and method verify the true identity of the user so that the user cannot set up an account under an anonymous or fake identity. Additionally, the present system and method are designed to prevent a real user from setting up multiple accounts or using multiple identities, either intentionally or unintentionally. This is achieved by analyzing data received from a user using different criteria.

In its basic form, the method utilizes input from the user and three criteria or actions for validating a user from the input or information that is received from the user. The first includes correlating information received from a user in the form of photos of live facial images and facial images present on a photo ID of the user, to determine whether or not the facial images are of the same user. Second, the received information from the user is validated by a verification entity to determine whether the received information is factually accurate. Lastly, a singularity criteria is used to determine whether the user is a single unique new user or an existing user.

With respect to the user input that is received by the system, this requires the user to have a government or other trustworthy photo ID card with a photograph of the user's face provided on the ID card, as well as non-facial information regarding the user. Non-facial information on the ID card, such as address, license or ID number, birthdate, is automatically gathered from the ID using photo or optical scanning techniques that are uploaded or collected in a system database. This may optical-character recognition (OCR) or the scanning of a barcode, such as a 2D barcode (e.g., PDF417 barcode) that is often provided on government IDs containing such information.

The user input also includes a photograph or captured facial image of the user holding his or her photo ID so that both the user's face and the face on the photo ID are captured in the same image or frame and the image is uploaded or collected by the system database.

Correlation requires the collected data of the photo of the user's face and the face on the photo ID from the captured image to be analyzed, such as using facial recognition, to determine that that the probability of the face of the person in the photo and on the photo ID are the same is very high or above a selected threshold of probability. If the facial recognition system cannot make such a determination, further input from the user may be required, such as resubmission of the same or a different photo, until such a determination is made.

Verification takes the collected information from the photo ID and determines its validity. The information, such as birthdate, address, license or ID number, etc., are authenticated with a trustworthy source (e.g., government database, etc.) to confirm that it conforms to that of the trustworthy source. The verification may also include checking the date of birth of the user with the current date to determine that the user is of a selected or authorized age. If the user's data is valid and the user is of an authorized age or meets other authorized criteria, the user is validated by the system confirming that the user is authentic and is not using false information and is of an authorized age.

Once the user's information has been successfully correlated and verified, a singularity operation is performed. Here, the system compares the data from any previous submissions to the system to determine whether the user already has an existing account or profile or corresponds to an existing user. If no such account or user is located, the user may be authorized to create an account or proceed with other authorized online activity. All or some of the account information for the user, such as the user's name, location, etc., can be made public, if desired, to prevent anonymity in certain applications. In other instances, all or some of the account information can be kept private.

By using the user verification system, fake, multiple, unauthorized or bot accounts are prevented from being created and used. The system also discourages or prevents those undesirable online behaviors previously discussed.

The embodiments described herein may include a method, system, or computer program product. Accordingly, the various embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, certain embodiments may take the form of a computer program product embodied in one or more non-transitory computer readable medium(s) having computer readable program code embodied thereon with instructions for performing various actions.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk or drive, a solid state drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any non-transitory tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device, partly on the user's computing device, as a stand-alone software package, partly on the user's computing device and partly on a remote computing device(s) or server(s) or entirely on a remote computing device(s) or server(s). In the latter scenario, the remote computing device or server may be connected to the user's computing device and/or other remote computing devices or servers through any type of network, including a local area network (LAN) or a wide area network (WAN), or the connection may be made to an external computing device (for example, through the Internet using an Internet Service Provider).

Aspects of the embodiments may be described with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device, special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer device, other programmable data processing apparatus, or other devices to cause a series of operational steps to be performed on the computer device, other programmable apparatus or other devices to produce a computer implemented process such that the instructions which execute on the computer device or other programmable apparatus provide processes for implementing the functions/acts specified in the flowchart and/or block diagram block or blocks.

The schematics, flowchart and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," and/or "consisting of" when used in the detailed description, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The invention can take the form of an entirely hardware embodiment, an entirely software embodiment or an embodiment containing both hardware and software elements. Certain embodiments may be implemented in software, which includes but is not limited to firmware, resident software, microcode, FPGA bitstream, etc. The software may be preinstalled on a mobile device or other computing devices or it may be downloaded or otherwise received by a mobile device or other devices through a network or other source.

Furthermore, certain embodiments of the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, touchscreens, cameras, microphones, speakers, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, Ethernet cards, wireless network adapters, etc., are just a few of the currently available types of network adapters.

Figure 2:
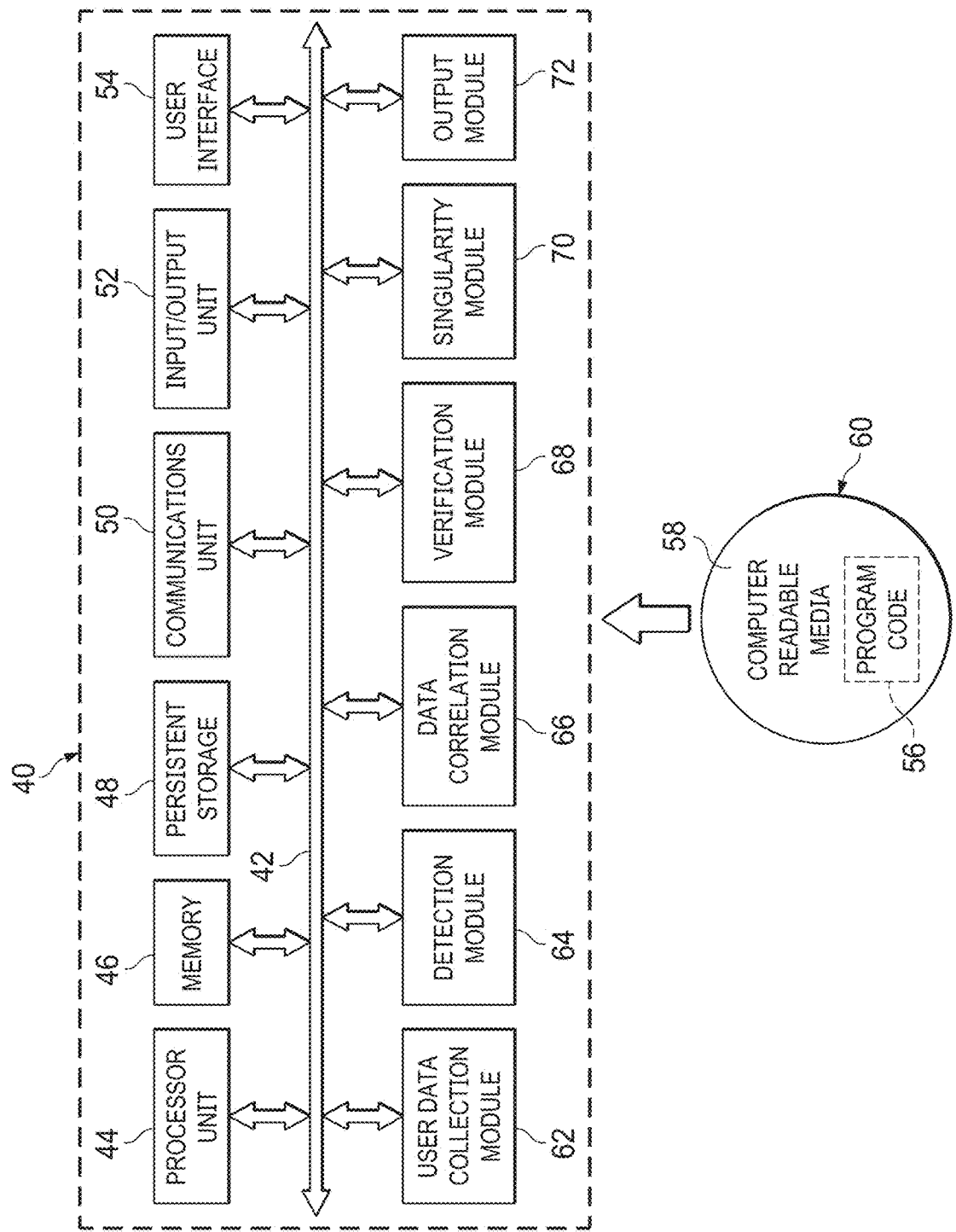
FIG. 2 is a block diagram of a data processing system of the user identity verification system in which illustrative embodiments may be implemented.
Figure 3:
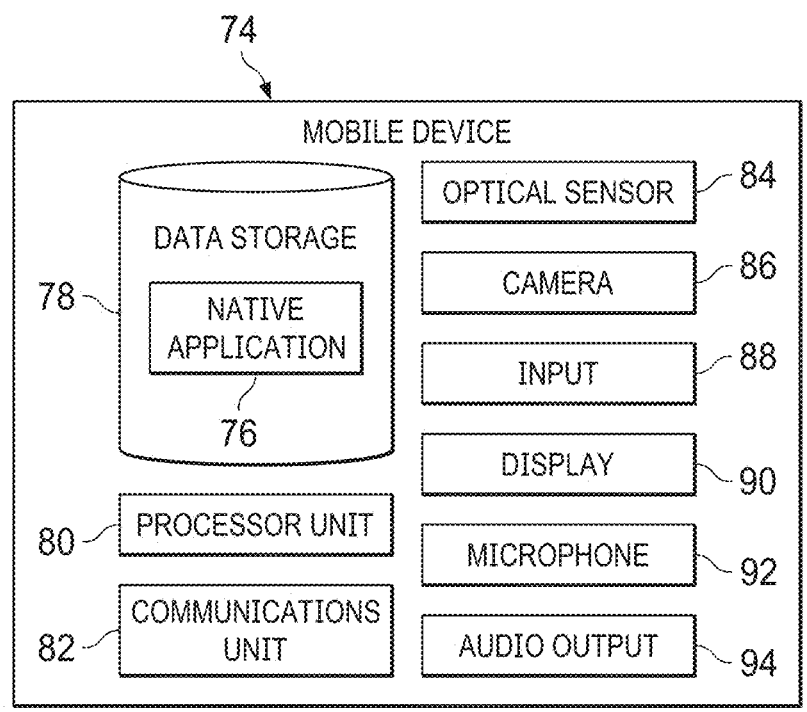
FIG. 3 is a block diagram of a computer or mobile device in which illustrative embodiments may be implemented.

With reference to FIGS. 1-3, exemplary diagrams or schematics of data processing environments are provided in which illustrative embodiments may be implemented. It should be appreciated that the data processing environments of FIGS. 1-3 are only exemplary and are not intended to assert or imply any limitation with regard to the environments in which different embodiments may be implemented. Many modifications to the depicted environments may be made.

FIG. 1 depicts a representation of a user identity verification system in which illustrative embodiments may be implemented. The user identity verification system 10 may include a network of computers or computing devices. The user identity verification system 10 contains network 12, which is the medium used to provide communications links between various devices and computers connected together within the user identity verification system 10. Network 12 may include connections, such as wire, wireless communication links, fiber optic cables, etc.

In the depicted example, server 14 and server 16 of the system 10 connect to network 12 along with storage unit 18. In addition, clients 20 and 22 connect to network 12. Clients 20 and 22 may be, for example, personal or network computing devices of the system 10. In the depicted example, servers 14 and 16 provide data, such as boot files, operating system images, and applications to clients 20 and 22 of the user verification system 10. Clients 20 and 22 are clients to server 14 in this example. The user identity verification system 10 may include additional servers, clients, and other devices not shown.

Mobile phone (cell) towers 24 and base stations (e.g., Wi-Fi base stations) 26 that facilitate communications and connectivity of mobile devices, such as mobile device 28, with the network 12 and that allow communications between computing or mobile devices, such as laptop computer 30 and tablet computer 32 may also be part of the system 10. In this illustrative example in FIG. 1, mobile device 28 is a mobile phone, such as a smart phone, in the possession of a user 34 to which the identity verification process may be performed by the system 10 in accordance with the embodiments that are described herein. The mobile device 28 is connected to the network 12, such as through the mobile phone (cell) towers 24 and base stations 26. Additionally, other users 36, 38 of computer or mobile devices, such as devices 30, 32 may be connected to the network 12 in a similar manner. The users 36, 38 may be users for which their identity is to be or has been previously verified by the system 10. The mobile devices 28, 30, 32 may also constitute clients, such as the clients 20, 22.

Program code located in the user identity verification system 10 may be stored on a computer recordable storage medium and downloaded to a data processing system or other device for use. For example, program code may be stored on a computer recordable storage medium on server 14 and downloaded to computing or mobile devices 28, 30, 32 or clients 20, 22 over network 12 for use thereon.

In FIG. 1, the user identity verification system 10 includes the Internet with network 12 including a worldwide collection of networks and gateways that use the Transmission Control Protocol/Internet Protocol (TCP/IP) suite of protocols and/or User Datagram Protocol/Internet Protocol (UDP/IP protocols) to communicate with one another. At the heart of the Internet is a backbone of high-speed data communication lines between major nodes or host computers, consisting of thousands of commercial, governmental, educational and other computer systems that route data and messages. Of course, the user identity verification system 10 also may be implemented as a number of different types of networks, such as for example, an intranet, a local area network (LAN), or a wide area network (WAN). The user verification system 10 of FIG. 1 is intended as an example, and not as an architectural limitation for the different illustrative embodiments.

With reference to FIG. 2, a block diagram of a data processing system 40 is shown in which illustrative embodiments may be implemented. Data processing system 40 is an example of a computer or computers, such as servers 14, 16 or clients 20, 22 in FIG. 1, in which computer usable program code or instructions implementing the processes may be located for the illustrative embodiments. In this illustrative example, data processing system 40 provides a platform for the user verification system 10 and includes communications fabric 42, which provides communications between processor unit 44, memory 46, persistent storage 48, communications unit 50, input/output (I/O) unit 52, and a user interface 54.

Processor unit 44 serves to execute instructions for software that may be loaded into memory 46. Processor unit 44 may be a set of one or more processors or may be a multi-processor core, depending on the particular implementation. Further, processor unit 44 may be implemented using one or more heterogeneous processor systems in which a main processor is present with secondary processors on a single chip. As another illustrative example, processor unit 44 may be a symmetric multi-processor system containing multiple processors of the same type.

Memory 46 and persistent storage 48 are examples of storage devices. A storage device is any piece of hardware that is capable of storing information, on a temporary basis and/or a permanent basis. Memory 46, in these examples, may be, for example, a random access memory or any other suitable volatile or non-volatile storage device. Persistent storage 48 may take various forms depending on the particular implementation. For example, persistent storage 48 may contain one or more components or devices. For example, persistent storage 48 may be a hard drive, a flash memory, a rewritable optical disk, a rewritable magnetic tape, or some combination of the above. The media used by persistent storage 48 also may be removable. For example, a removable hard drive may be used for persistent storage 48.

Communications unit 50, in these examples, provides for communications with other data processing systems or devices. For instance, communications unit 50 may be a network interface card. Communications unit 50 may provide communications through the use of either or both physical and wireless communications links.

Input/output unit 52 allows for input and output of data with other devices that may be connected to data processing system 40. For example, input/output unit 52 may provide a connection for user input through a keyboard, mouse, camera, microphone, touchscreen, gesture commands, voice commands, etc. A user interface 54 provides a mechanism to provide information to a user, such as a visual display and/or audio output.

Instructions for the operating system and applications or programs are located on persistent storage 48. These instructions may be loaded into memory 46 for execution by processor unit 44. The processes of the different embodiments may be performed by processor unit 44 using computer implemented instructions, which may be located in a memory, such as memory 46. These instructions are referred to as program code, computer usable program code, or computer readable program code that may be read and executed by a processor in processor unit 44. The program code in the different embodiments may be embodied on different physical or tangible computer readable media, such as memory 46 or persistent storage 48.

Program code 56 is located in a functional form on computer readable media 58 that may be selectively removable and may be loaded onto or transferred to data processing system 40 for execution by processor unit 44. Program code 56 and computer readable media 58 form computer program product 60 in these examples. In one example, computer readable media 58 may be in a tangible form, such as, for example, an optical or magnetic disc that is inserted or placed into a drive or other device that is part of persistent storage 48 for transfer onto a storage device, such as a hard drive that is part of persistent storage 48. In a tangible form, computer readable media 58 also may take the form of a persistent storage, such as a hard drive, a thumb drive, or a flash memory that is connected to data processing system 40. The tangible form of computer readable media 58 is also referred to as computer recordable storage media. In some instances, computer recordable media 58 may not be removable.

Alternatively, program code 56 may be transferred to data processing system 40 from computer readable media 58 through a communications link to communications unit 50 and/or through a connection to input/output unit 52. The communications link and/or the connection may be physical or wireless in the illustrative examples. The computer readable media also may take the form of non-tangible media, such as communications links or wireless transmissions containing the program code.

In some illustrative embodiments, program code 56 may be downloaded over a network, such as network 12 (FIG. 1), to persistent storage 48 from another device or data processing system for use within data processing system 40. For instance, program code stored in a computer readable storage medium in a server data processing system may be downloaded over a network from the server to data processing system 40. The data processing system providing program code 56 may be a server computer, a client computer, or some other device capable of storing and transmitting program code 56.

The different components illustrated for data processing system 40 are not meant to provide architectural limitations to the manner in which different embodiments may be implemented. The different illustrative embodiments may be implemented in a data processing system including components in addition to or in place of those illustrated for data processing system 40. Other components shown in FIG. 2 can be varied from the illustrative examples shown.

As one example, a storage device in data processing system 40 is any hardware apparatus that may store data. Memory 46, persistent storage 48, and computer readable media 58 are examples of storage devices in a tangible form.

In another example, a bus system may be used to implement communications fabric 42 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 46 or a cache such as found in an interface and memory controller hub that may be present in communications fabric 42.

As shown in FIG. 2, the data processing system 40 may further include various system modules 62, 64, 66, 68, 70, 72. These include a user data collection module 62, a detection module 64, a data correlation module 66, a comparison module 68, a singularity module 70, and an output module 72. Each of the different modules may constitute a software component of the data processing system 40 all or a portion of which is stored in the memory 46 and/or persistent storage 48 and processed by the processing unit 44. In alternate embodiments, the modules may be a combination of software and hardware.

The user data collection module 62 is stored in the memory 46 and/or persistent storage 48 and processed by the processing unit 44 and is used to collect data from the user that is received over the network 12 in the verification system 10. With respect to the data collection module 62, the data collection module 62 is used to collect data from one or more of the computer or mobile devices 28, 30, 32 of the users 34, 36, 38, respectively. This is in the form of photographic images collected from the devices 28, 30, 32, such as a camera provided with the device, as well other input, such as textual or audio input, that may be input by the user on the device using a keyboard, microphone, or other input device.

In particular, the user data collection module 62 is used to receive data from a user that comprises a first photo containing a live facial image of the user and an identification document that contains a photographed facial image. A second photo of the identification document of the first photo that contains the photographed facial image is also collected with the user data collection module 62. The second photo is an enhanced or larger photo of the identification document to facilitate discernment of features contained in the identification document. The user data collection module 62 is also used to receive non-facial identifying user data contained in the identification document of the second photo or that is contained in a third photo of the identification document. As used herein, the terms "photo" and "image" and variations thereof may be used interchangeably unless it is otherwise apparent from the context. In most, if not all cases, the photos or images are digitized or in electronic form for use by the verification system 10.

The user data collection module 62 can also be used to collect non-photo data from a user, such as textual or audio data that is input by the user on a keyboard, a microphone, or other input device.

Detection module 64 is also stored in memory 46 and/or persistent storage 48 and is processed by the processing unit 44 for analyzing the user data received by the user data collection module 62. The detection module 64 is used to detect facial images and non-facial identifying data from the collected photos.

The data correlation module 66 is stored in memory 46 and/or persistent storage 48 and is processed by the processing unit 44 for correlating the detected facial images from the detection module 64 of the first and second photos or other photos of the system, such as photos of preexisting users, and determines whether or not the facial images are of the same person.

The verification module 68 may also be stored in memory 46 and/or persistent storage 48 and is processed by the processing unit 44 for verifying the detected non-facial identifying data by comparing the received non-facial identifying data from the user to non-facial identifying data of a verification entity to determine whether or not the detected non-facial identifying data is valid or not valid.

The singularity comparison module 70 of the data processing system 40 is stored in memory 46 and/or persistent storage 48 and is processed by the processing unit 44 for comparing the received data from the user to preexisting stored data of other users to determine whether the user is a singular unique user or an existing user.

The output module 72 of the data processing system 40 is stored in memory 46 and/or persistent storage 48 and is processed by the processing unit 44 and provides a verification result to the user on a user interface.

As previously discussed, the user identity verification system and method receive data collected from the computer or mobile devices 28, 30, 32 of users 34, 36, 38, respectively, while the user attempts to set up an account or profile on the system with other users. The computer or mobile devices that are used in collecting data that is received by the identity verification system will typically have a variety of different features for use by the user identity verification system 10.

FIG. 3 is a schematic of an exemplary computer or mobile device 74 in which illustrative embodiments may be implemented. In particular, mobile device 74 is representative of a computing device, such as the computer or mobile devices 28, 30, 32 shown in FIG. 1. Moreover, the mobile device 74 can include a data processing system, such as the data processing system 40 or a similar data processing system with all or less than all of the components described with respect to the processing system 40. Further, in this illustrative example in FIG. 3, the device 74 may constitute a smartphone (e.g., iPhone® mobile phone, Android® mobile phone, etc.). In some embodiments, mobile device 74 may be a desktop computer, a laptop computer, a tablet computer, or any other electronic computing device having analogous components capable of providing similar functionality.

The device 74 may be provided with a client application in the form of a native mobile application 76. The native application 76 may be obtained from an application service provider (ASP) that provides the verification software to the device 74 from the verification system 10 through the network 12. The ASP may be the verification system operator itself or another third party that utilizes the verification system. The native application 76 may be the verification software itself or the verification software may be a software component of the native application. The verification application software or software component may be stored on one or more of the servers 14, 16, which may be operated and maintained by the ASP or the verification system operators, or elsewhere within the verification system 10, such as data storage 18. The application 76 may be part of a web-based verification system platform wherein functions described herein may be performed on other devices, through either a dedicated application or a web-browser interface. A previously verified user may provide login credentials to the native application 76 to access and enter information on the verification system 10 that is then accessible from any device by providing the same login credentials.

As shown in FIG. 3, the native application 76 is stored in data storage 78 of the device 74. The data storage 78 may include memory (RAM) and persistent storage, with all or a portion of the native application 76 being stored on these. A computer processor unit 80 is provided with the device 74 for running programs and processing data. A communications module 82, including hardware and software, which provides communications from and to the device 74 through the use of either or both physical and wireless communications links, and which allows the device 74 to connect to the network 12.

The computer or mobile device 74 is also provided with one or more other features. The native application 76 makes use of these features of the device 74 to collect data that is then provided through the network 12 from the device 74 to the data collection module 62 of the verification system 10.

As shown in FIG. 3, the computer or mobile device 74 includes various modules, which may include both software, hardware, and any necessary devices necessary for the collecting the relevant data and providing a user interface for providing an output from the verification system to the user. The modules include, but are not limited to, a light or optical sensor module 84, a camera module (which may also function as a light or optical sensor module) 86, an input module 88, such as a touchscreen, keyboard, mouse, etc., a display module 90, a microphone module 92, and an audio output module 94, such as a speaker, phone jack, wireless audio signal (e.g., Bluetooth signal for wireless speakers), etc.

One or more of each module may be provided on the device 74. For example, current mobile devices are typically provided with a forward-facing camera and a rearward-facing camera. Thus, a separate camera module, such as the camera module 86, may be provided for each camera.

With respect to the light or optical sensor module 84 this may encompass the use of cameras, such as the camera module 86, as well as other non-camera optical devices. Such non-camera optical devices are those devices that do not necessarily function as a camera for capturing images but are otherwise capable of detecting or sensing light or optical data. The light sensor or optical devices may be in the form of devices or sensors that detect, sense, or capture light gradients, contrasting or variations in light or light intensities, such as an optical scanner or barcode reader. The light or optical sensor module 84 may have software for detecting and decoding such codes. Such optical sensor module may also emit light that is then reflected and detected by the optical sensor module.

With respect to the camera module 86, this may be used to collect both static images (photos) and non-static image data, such as videos. Furthermore, camera module 86 may include object recognition software that allows the recognition and identification of certain objects. This may include such things as facial recognition for identify human individuals and which may be general (recognition of a human individual) or specific recognition (recognition of a particular unique and identifiable individual) of such individuals.

The input module 88 may be that which allows the user to input data or commands on the computer or mobile device 74. This may be in the form of a touchscreen, keyboard, mouse, microphone, camera and software for sensing non-tactile gestures, etc.

The microphone data module 92, which may also form part of the input module 88, may make use of the computer or mobile device's built-in microphone (used for communications) or a different microphone.

The audio output module 94 may be that which provides audio for feedback, prompts, instructions, etc. The audio output module may include such things as a speaker of the device, a phone jack for connecting to a speaker or earphones, a wireless audio signal, such as Bluetooth for wireless speakers or headphones, etc.

Figure 4:
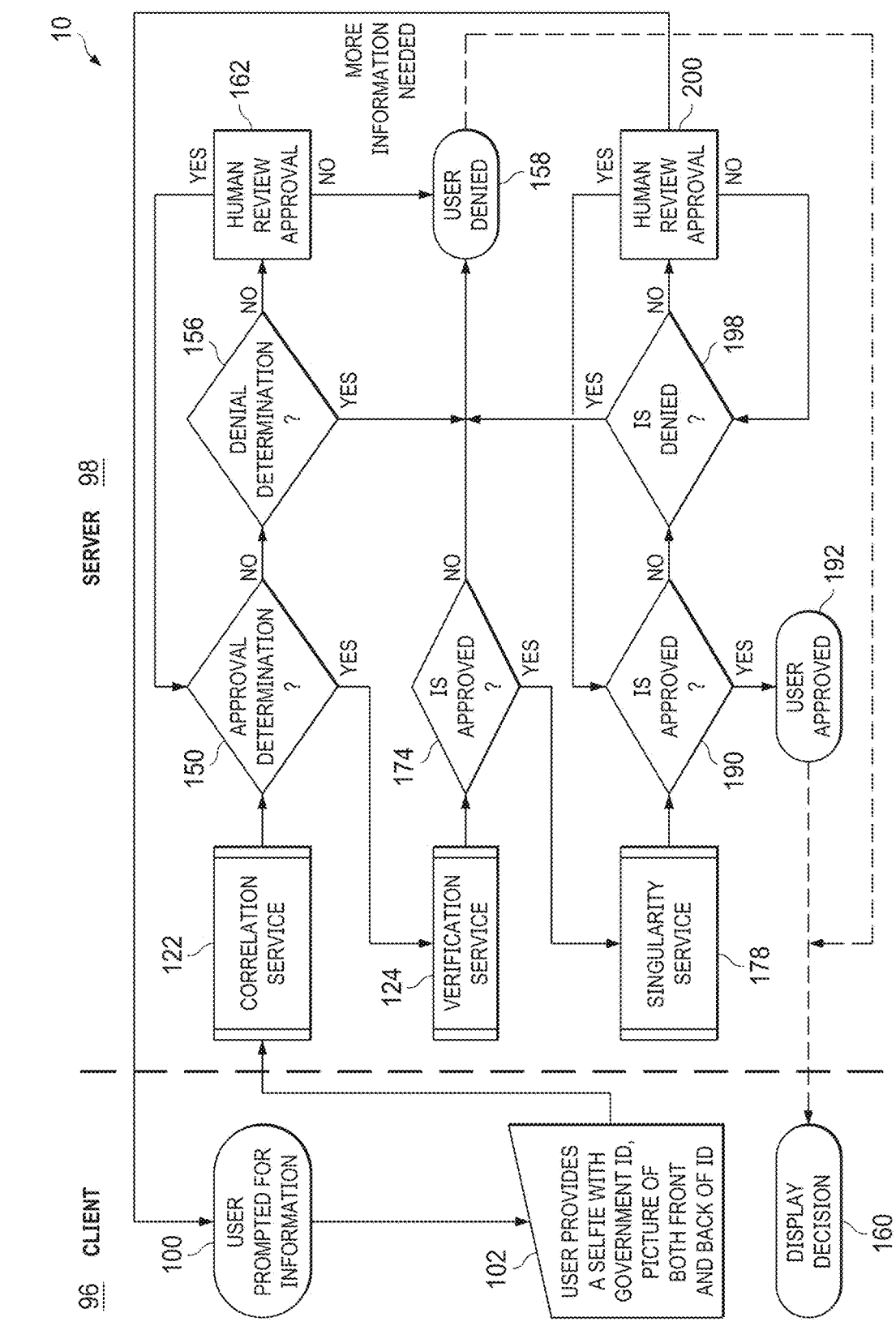
FIG. 4 is an overall flow diagram for a method of verifying the identity of a user in accordance with an illustrative embodiment.

Referring to FIGS. 4-10, flow diagrams are shown that illustrates the methods and process steps used in exemplary embodiments of the verification system 10. FIG. 4 shows an overall flow diagram for the method of verifying the identity of a user. As shown, the process steps are those shown as being divided by those performed on the client side 96, i.e., on the user's computer or mobile device, that is connected through a network to the server side 98, which may be formed by one or more servers of the user identity verification system 10. While certain steps are shown being performed on the server side 98, some or all of them may be performed on the client side 96 or vice versa in particular embodiments. In most cases, the process steps will be performed on the client 96 and server 98 as is shown in FIG. 4.

When a user of the verification system accesses the system through the user's computer or mobile device, the system provides a prompt 100 to the user to provide certain information. This can include a prompt to manually enter information as well as provide the required photos, as described below. The prompt may occur with the creation of a new account or profile for an application, website, etc. It should be noted that when the user accesses the verification system, it may be through the verification application itself or through a third-party application, such as a social media application, that utilizes or incorporates the verification system into its application.

Figure 5:
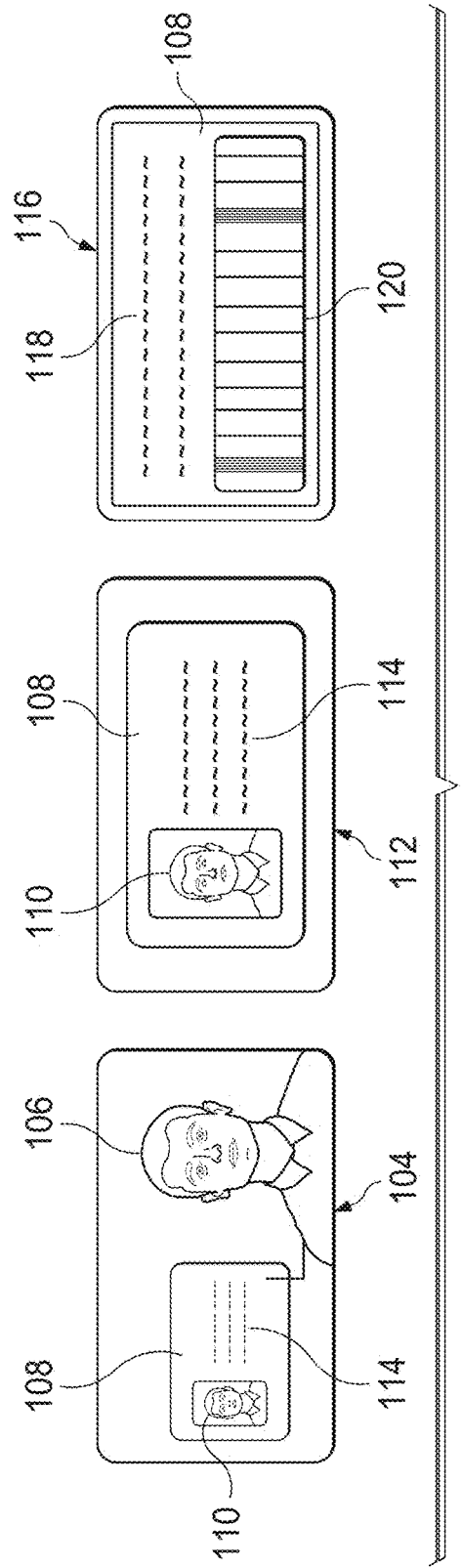
FIG. 5 is a plan view of photos containing a live facial image of a user along with images of a user photo ID that are used in illustrative embodiments that may be implemented in the system and method of verifying the identity of a user.

The user provides the requested information in step 102. The information requested in 100 and provided by the user in 102 includes at least a first photo 104 containing a live facial image 106 of the user, as shown in FIG. 5. The first photo 104 also includes an image of a front side of identification document or photo ID 108, such as a government-issued ID, that contains a photographed facial image 110 of the user as part of the identification document 108. While the identification document 108 will typically be a government ID, such as a driver's license, state issued ID, passport, military ID, government employee ID, etc., it can also be any non-government identification document that is considered sufficiently trustworthy and can be verified using the verification system, as is described herein.

The photo 104 will typically be a "selfie-type" image wherein a front- or user-facing camera of the computer or mobile device is used to capture the facial image 106 of the user as they are holding or presenting the identification document 108 so that the live facial image and the photographed facial image on the ID are both captured together in a single photograph 104. In some applications, the photo 104 is the only photo used for detecting facial images, such as the facial images 106 and photographed facial image 110. The photo 104 is typically a still photo. In other embodiments, however, the photo 104 may be a video clip or series of two or more still photos taken sequentially over a short span of time.

In other embodiments, the requested information from 100 may also include a second photo 112 of the identification document 108 of the first photo 104 that contains the photographed facial image 110. This second photo 112 may be taken with the rear-facing camera of a mobile device and submitted by the user in 102. This second photo 112 is an enhanced photo of the front face of the identification document to facilitate improved discernment of features contained in the identification document, such as the facial image 110 of the photo ID 108. This will typically be an enlarged photo of the identification document 108 itself that contains the facial image 110 of the user, such as may be taken at a closer distance with the rearward-facing camera of the mobile device. Such rearward-facing cameras also may have a higher resolution than the forward-facing camera used for taking selfies and the like, which may also enhance the second photo 112 for better discernment of the photo features.

Non-facial identifying data 114 contained in the identification document 108 in either the first or second photos 104, 112 may be used by the verification system. This non-facial identifying data 114 may be human-readable printed textual data and/or machine-readable data such as a barcode, which may include a linear bar code, a stacked linear barcode, a 2D barcode, a PDF417 barcode, etc., Such barcodes are machine readable and can be interpreted or converted into human-readable data using appropriate barcode-reading software and devices.

In some or all cases, such as when no or only a portion of the required non-facial identifying data is present in the first photo 104 and/or the second photo 112, a third photo 116 (FIG. 5) of a rear or reverse side 118 of the identification document 108 is requested in 100 and provided by the user in 102. The third photo 116 will also typically be an enlarged photo of the identification document 108 itself that is taken at a closer distance than the photo 104 using the rearward-facing camera of the mobile device. The reverse side 118 of the document 108 may contain non-facial identifying data 120. The non-facial identifying data 120 may be human-readable printed textual data and/or machine-readable data, such as a barcode, which may include a linear bar code, a stacked linear barcode, a 2D barcode, a PDF417 barcode, etc.

The non-facial identifying data 114 and/or 120 may include, but is not limited to, the user's name, birthdate, address, place of birth, and one or more identification numbers, such as a driver's license number, state ID number, social security number, passport number, department of defense (DoD) ID number, government employee ID number, etc. Other non-facial identifying data that may be present on the identification document 108 may or may not be used depending upon the particular application. This may include such things as ID issue dates, ID expiration dates, and physical features of the user, such as hair color, eye color, height, weight, etc.

In step 102, the user may have an opportunity to review both the facial and/or non-facial identifying data prior to their submission or transmission. Interpretation or decoding of any barcodes or machine-readable data may be provided to the user on the interface of the user's computer or mobile device so that they can review the information. Such interpretation or decoding may occur on either one or both of the client 96 or server side 98, depending upon the configuration of the system 10. If there are any errors, the user may be given an opportunity or be allowed to retake any photos or provide other information that may be entered manually by the user prior to its submission.

The received facial and non-facial identity data from 102 is transmitted via the network 12 (FIG. 1) and is received by the server side 98 by one or more servers of the verification system 10, such as the servers 14, 16. This may be carried out by the data collection module 62 of data processing system 40, shown in FIG. 2. This is also shown in FIG. 4, wherein the data from 102 is received by a server of the verification system in correlation operation 122. This transmission from the user may be an encoded transmission that is received by the system 10 so that it remains secure. This may be achieved through encryption, hashing, plaintext forwarding, or other encoding techniques. In some are all cases where data is transmitted and received in and through the verification system 10, the data may be encoded and such encoded transmission may be used in some or all cases to protect the data as it is being transmitted and received through the various communication links. The data may also be stored, temporarily and/or permanently, in the system 10 as encoded data. The data may be encoded so that it cannot be decoded but may be created as unique encoded data so that it can be used for comparison purposes by the system 10.

The data received by the data collection module 62 in the correlation step 122 includes the facial identifying data 106, 110 from the photos 104 and 112. The non-facial identifying data 120 from photo 116 may also be received together with the facial data 106, 110 in the correlation step 122 for later transmission and use in a verification step 124. While the received data from 102 is shown as being initially received in the correlation step 122, in other embodiments, the non-facial data 120, with or without the facial identifying data 106,110, may be initially transmitted in 102 and received in the verification step 124, with any facial identifying data 106, 110 being later transmitted and used in the correlation step 122. In some embodiments, only facial identifying data is received in the correlation step 122 and only non-facial identifying data is received in the verification step 124.

The correlation step 122 and the verification step 124 may be carried out sequentially one after the other or together simultaneously or substantially simultaneously. For ease of description, the identification process will be described with the correlation step 122 being carried out first, followed by the verification step 124. It should be apparent to those skilled in the art, that a different sequence may be used or these steps may be performed simultaneously or substantially simultaneously.

Figure 6:
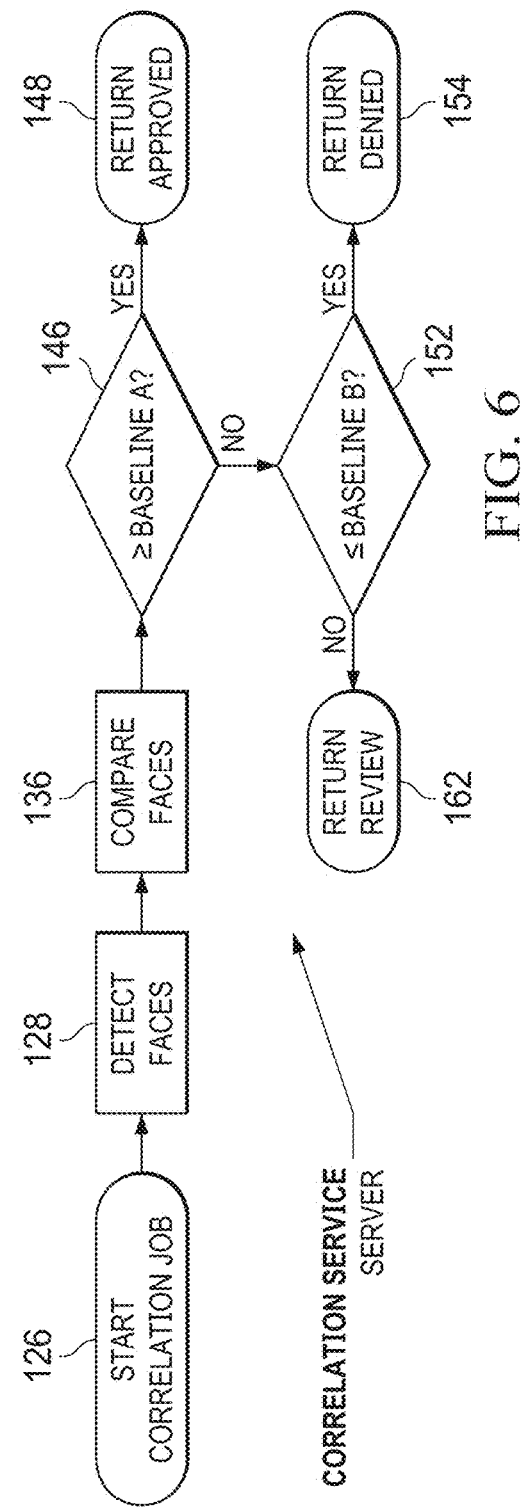
FIG. 6 is a flow diagram of a method of correlating detected facial images of the photos of FIG. 5 and determining whether or not the facial images are of the same person carried out in accordance with an illustrative embodiment.

Referring to FIG. 6, a process flow diagram for the correlation procedure 122 is shown. As shown, in the correlation job 126 faces of the facial identifying data 106, 110 from the photos 104, 112 are detected in 128. The detection may be carried out by the detection module 64 of the data processing system 40 of FIG. 2.

Figure 7:
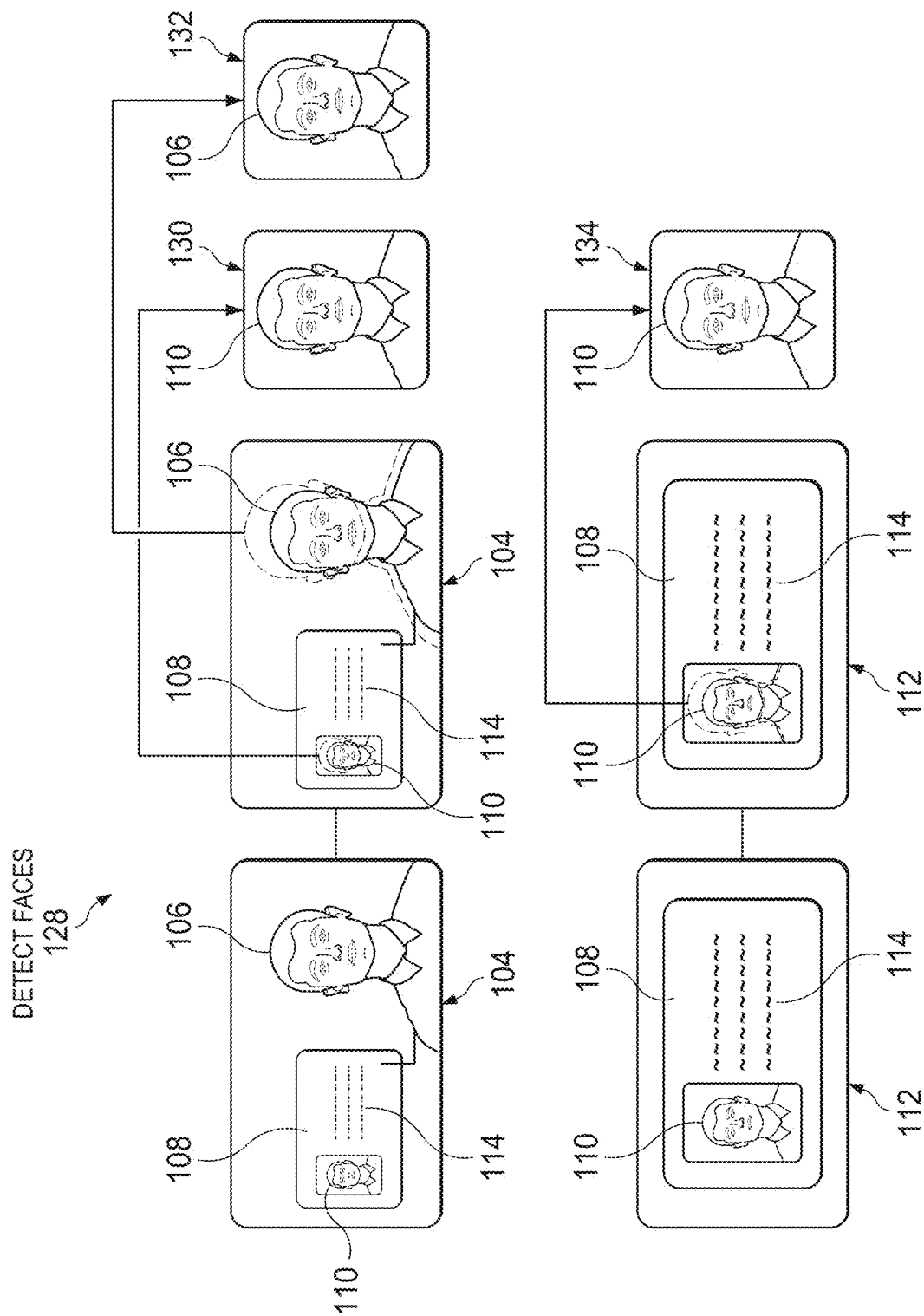
FIG. 7 is a flow diagram of a facial photo extraction process used in the correlation method of FIG. 6 carried out in accordance with an illustrative embodiment.
Figure 8:
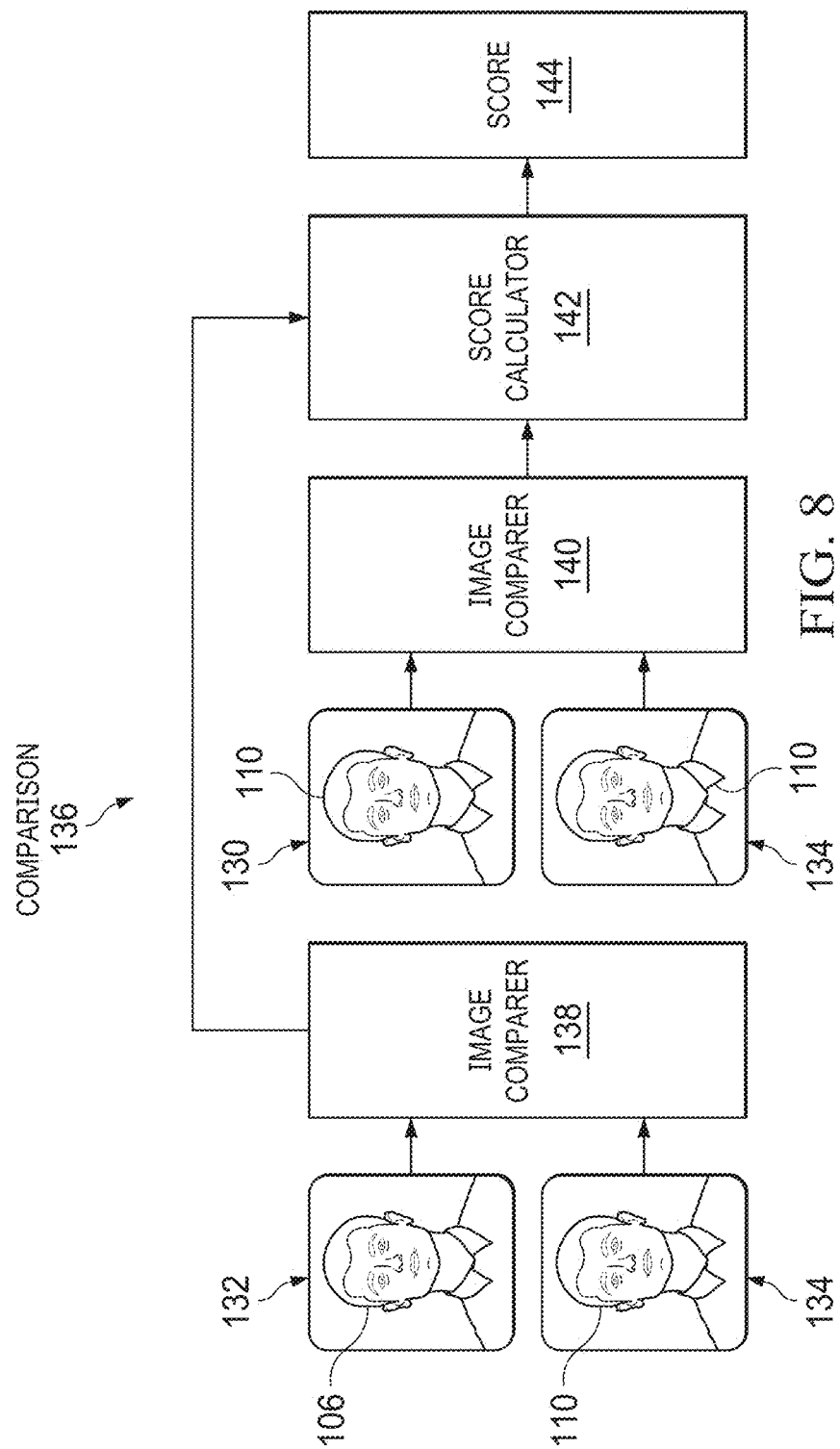
FIG. 8 is a flow diagram of a facial detection and correlation process used in the correlation method of FIG. 6 carried out in accordance with an illustrative embodiment.

The detection process 128 may further include the process steps shown in FIG. 7. The detection procedure may include detecting the facial images 106, 110 from photo 104 and cropping and extracting only those portions of photo 104 that contain the facial images 106, 110 from photo 104 to form new photos or images 130, 132 of the facial images 106, 110, respectively. Likewise, the facial image 110 from photo 112 is also detected and only the portion of the photo 112 that contains the facial image 110 is cropped and extracted and used to form new facial image photo 134. Using such portions of the original photos 104, 112 reduces their file size to facilitate improved processing, storage, and transmission of the photo data. In other embodiments, the original photos are used as is, without cropping or extracting only those portions of the photos 104, 112 containing the facial images.

Referring to FIG. 6, after the facial images are detected and the new images 130, 132, 134, if any, are created, the facial images 106, 110 of the photos 130, 132, 134 are compared in step 136. The data correlation module 66 of data processing system 40 (FIG. 2) may be used to analyze facial images 106, 110 to determine whether the facial images are of the same person in the correlation step 122 (FIG. 4). All or a portion of the correlation step 122 may occur on the client or server side of the system 10. A sophisticated facial recognition program that is capable of recognizing the facial features and determining the probability that the facial images correlate to or are the same person may be used. Such facial recognition programs are known in the art, such as those currently used for security purposes to unlock mobile phones, for logins to applications, and the like. This may also include image analysis software that looks for digitally altered or manipulated images to facilitate if any images have been altered or tampered with, such as through Photoshop® programs and the like. Additionally, features that are subject to change, such as hair, clothing (e.g., hats, scarves, etc.), piercings, eyeglasses, etc., that may appear with the facial images may be ignored or otherwise accommodated by the recognition software so that their presence or non-presence does not interfere with analyzing the facial images.

The comparison operation 136 of the facial images may be achieved by analyzing the images 106, 110 from photos 130, 132, 134. While the facial image 110 from the photo ID 108 should be the same in the photos 104, 112, 132, 134, because of the greater detail that may be present in the enhanced or larger image 110 of the photo ID 108 of the photos 112 or 134, greater weight may be given to the image 110 from photos 112 or 134 than from the image 110 from photos 104 or 132. The comparison operation 136 is shown in greater detail in FIG. 8. As shown, the live facial image 106 from photo 132 is compared to facial image 110 of the photo ID 108 from photo 134. This function may be performed by an image comparer 138, which may be a part of the correlation module 66 of data processing system 40. Similarly, the photo ID facial images 110 from photos 132 and 134 are also compared by an image comparer 140, which also may be a part of the correlation module 66 of data processing system 40 and may be the same or different than the image comparer 138.

The output from the image comparers 138, 140 is provided to a score calculator 142. The score calculator 142 provides a score output 144 that relates to the probability that the facial images are the same person and/or are from the same photo ID. The score output 144 will constitute a value that is measured against a selected baseline value or values. As an example, if the score output 144 is at or above a selected baseline value A according to baseline determination step 146 (FIG. 6), the facial images are considered to be of the same person and/or are from the same photo ID so that the correlation is positive and an approval 148 is created. The approval indication is sent to the approval determination step 150 of FIG. 4. Upon approval in 148, any one or more of the collected images 104, 112, 130, 132, 134 or portions thereof may be stored in the system 10, such as on one or more of the servers 14, 16 and/or data storage 18 (FIG. 1). This may form part of the data of a database of preexisting users for future use in the singularity process, as is discussed later. Such data may be encoded, such as through encryption, hashing, etc., so that it remains secure.

On the other hand, if in the determination step 146 the score output 144 (FIG. 8) is below the baseline value A, a second determination step 152 is used based upon a selected baseline value B. The baseline value B may be lower than the baseline value A. If the score output 144 is at or below the baseline value B, the facial images of the user cannot be considered to be correlated and the identity of the user in the live facial image is not considered to be the same person in the facial images of the photo ID 108. This results in a denial being created according to 154. The denial 154 output is sent to the denial determination operation 156 of FIG. 4.

An output of a verification result in the form of a denial output 158 may be provided as a decision to the user that is displayed or otherwise provided on the user's computer or mobile device 28, 30, 32 according to 160. Upon the denial 158, any or all of the photo images 104, 112, 130, 132, 134 may be deleted or removed from the system 10. In other applications, they may be stored or retained for various purposes.

Referring to FIG. 6, if the score output 144 is below the baseline value A but above the baseline value B according to determination step 152 (FIG. 6), the user facial image data is flagged or noted in determination step 156 (FIG. 4) for manual review according to step 162 by a human operator of the system 10. The human operator will then review the collected facial images and determine if the images are of same person and/or are from the same photo ID. If the human operator determines that they are not, a denial is issued according to 158, with the denial decision provided to the user according 160, as discussed previously.

If the human operator determines that the collected facial images are of same person and/or are from the same photo ID, this may operate as an approval that is provided to the approval determination 150, as has been previously discussed.

Upon successful correlation of the facial images 106, 110 of the photos 104, 112 or 130, 132, 134, a verification step 124 may be performed. The verification module 68 of data processing system 40 (FIG. 2) may be used to verify if the non-facial identification data is accurate according to step 124 (FIG. 4). As discussed previously, the verification step 124 may be carried out prior to or simultaneously with the correlation step 122. In the present example, the verification step 124 is carried out upon approval determination at 150.

Figure 9:
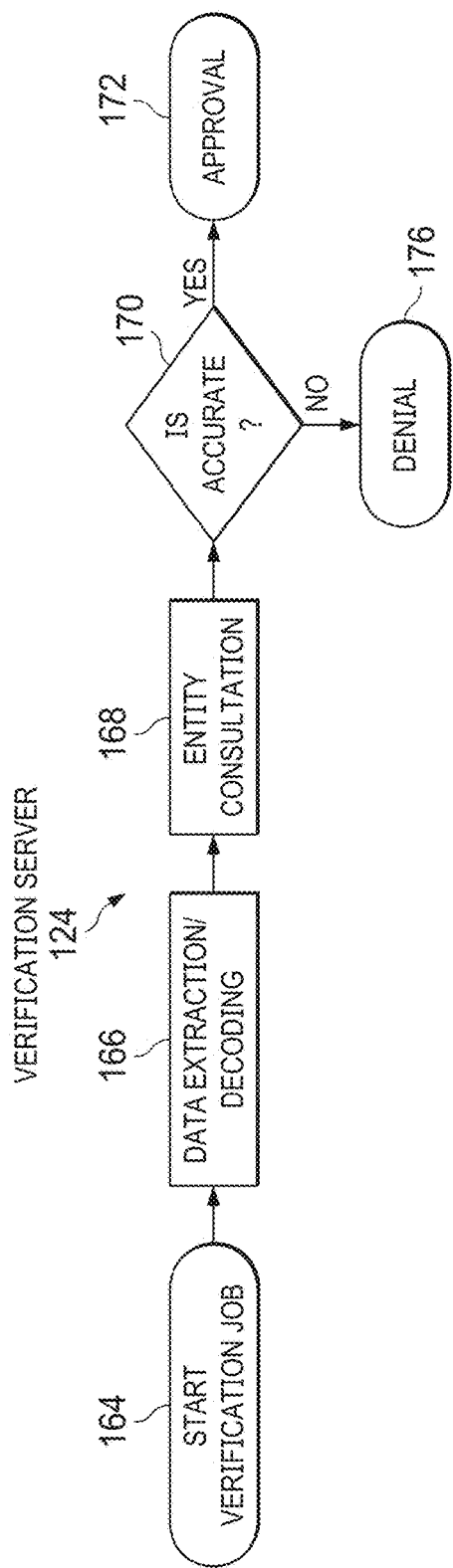
FIG. 9 is a flow diagram of a verification process used in the method of verifying the identity of a user wherein detected non-facial identifying data is verified by a verification entity in accordance with an illustrative embodiment.

Referring to FIG. 9, a detailed flow schematic of the verification process 124 is shown. As shown, the verification job is started at 164. Non-facial identifying data 114 and/or 120 (FIG. 5) from the photos 112 and/or 116, respectively, is extracted and/or decoded at 166. This may include human-readable printed textual data and/or machine-readable data, such as a barcode, which may include a linear bar code, a stacked linear barcode, a 2D barcode, a PDF417 barcode, etc. The client and/or server may be provided with any necessary hardware and software to read and/or decode the non-facial identifying data. As discussed previously, the non-facial identifying data may include, but is not limited to, the user's name, birthdate, address, place of birth, license number, and one or more identification numbers, such as a driver's license number, state ID number, social security number, passport number, department of defense (DoD) ID number, government employee ID number, etc. The non-facial data that is read and decoded may also include information about the ID itself, such as the type of ID and the entity or entities that issued such ID and/or where non-facial identifying information may be located and stored to initiate the verification process. Some non-facial identifying data that may be present on the identification document 108 may or may not be used depending upon the particular application. This may include such things as ID issue dates, ID expiration dates, and physical features, such as hair color, eye color, height, weight, etc. Such data may be retained or discarded. Discarding such unnecessary data improves processing, storage, and transmission of the retained data.

The non-facial identifying data may be validated by consultation 168 with a verification entity. The verification entity may be the same entity that issues the photo ID or a different entity that stores, maintains, or otherwise has access to such information. The verification entity should be a trustworthy source. In many cases, the verification entity will typically be the entity that issues the photo ID 108 data.

The consultation step 168 may be performed by the system 10 by submission of the extracted non-facial identifying data to the verification entity through the network 12 or other communication link(s). The verification entity may then provide an indication output, such as a Boolean value, of whether or not the extracted non-facial identification data is the same or different from non-facial identification data of the verification entity. Alternatively, a query or request for non-facial identification data of the user from the verification entity may be made by the system 10, which is then provided by the verification entity. The verification system then utilizes the received non-facial identification data from the verification entity and compares it to the extracted non-facial identifying data to determine whether or not it is the same.

If it is determined that the extracted non-facial identification data is accurate in decision step 170, the non-facial identification data will be considered to be valid and a verification approval 172 is provided to the approval determination step 174 of FIG. 4. Upon affirmative approval determination in 174, any portion or all of the collected non-facial identification data may be stored in the system 10, such as on one or more of the servers 14, 16 and/or data storage 18 (FIG. 1). This may then form part of the data of a database of preexisting users for future use in the singularity comparison process, as is discussed later. Such data may be encoded, such as through encryption, hashing, etc., so that it remains secure.

If it is determined that the extracted non-facial identification data is inaccurate, a denial 176 is returned and provided to the determination step 174. An output of the verification of result of the denial decision of the user's request is provided in step 158 and is displayed or otherwise provided on the user's computer or mobile device 28, 30, 32 according to 160. Upon the denial 158, any or all of the collected and extracted non-facial identification may be deleted or removed from the system 10. In other applications, this data may be stored or retained for various purposes.

In certain embodiments, the verification step may also include both a query for and reception of information data from the verification entity regarding the particular user that is not collected from the user by the system 10. This could include background information, such as a person's criminal record, restraining orders, etc., that would make the potential user unsuitable for inclusion in a particular community or social network. Receiving such information may also result in a denial being returned to the user.

It should be noted that no manual or human review option may occur in the verification of the non-facial identification data because the non-facial identification data of the photo ID should be the same as that on record with the verification entity. Any discrepancy in the non-facial identify data would therefore indicate that the photo identification or the information submitted was not authentic.

If the determination is made that verification is approved in step 174 of FIG. 4, a singularity operation 178 is then performed by the system 10. The singularity comparison module 68 of data processing system 40 (FIG. 2) may be used to compare the received data from the user to preexisting stored data of other users to determine whether the user is a singular unique user or an existing user.

Figure 10:
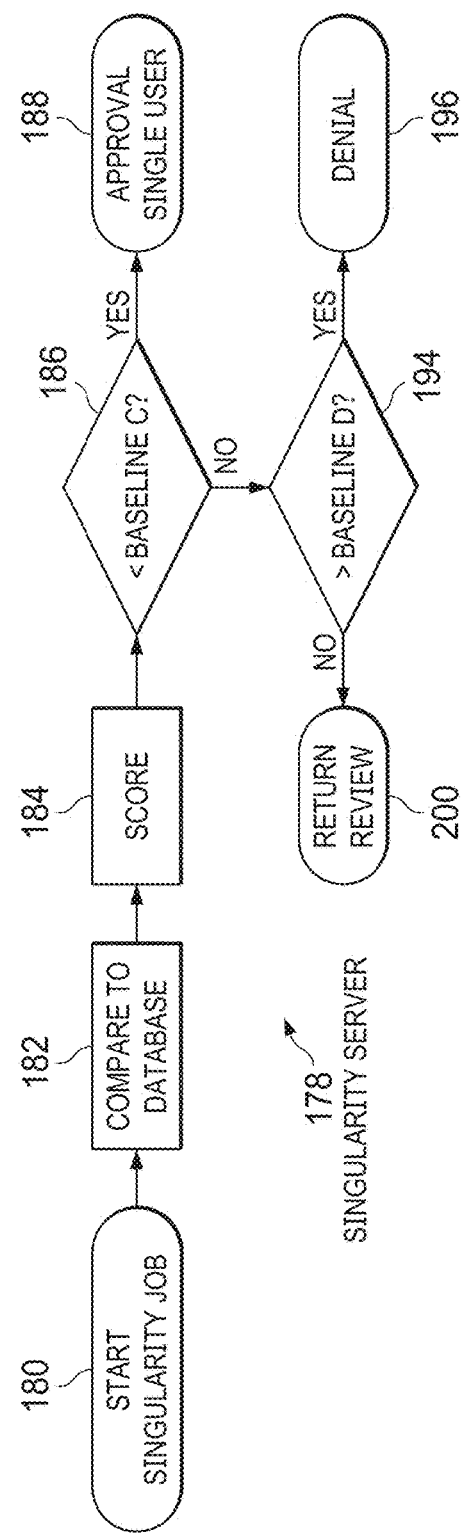
FIG. 10 is a flow diagram of a singularity process used in the method of verifying the identity of a user wherein received data from the user is compared to preexisting stored data of other users to determine whether the user is a singular unique user or an existing user of the system in accordance with an illustrative embodiment.

Referring to FIG. 10, a detailed flow schematic of the singularity comparison process is shown. The singularity job is started at 180. A comparison operation 182 is then performed to compare the received identification data from the user to preexisting stored data of other users that are stored in the system 10. The received data of the user can be any one or all or portions of the facial image data and/or non-facial image data. The received data can include any or all or portions of the facial images 106, 110 of photos 104, 112 or 130, 132, and 134. Sophisticated facial recognition programs that are capable of recognizing the facial features of the various stored preexisting user facial images, comparing them and determining the probability that the facial images correlate to or are the same person to that of the user being evaluated can be used for this purpose. Such preexisting facial image data may be facial image data of unidentified individuals or facial image data associated with identifying information that may differ from that of the user (e.g., facial images associated with a different username). In this way, the user can be recognized from preexisting stored facial image data that is not otherwise identified with the user.

Additionally, the singularity process can include the use of the collected and extracted non-facial identification data 114, 120. This non-facial identity data is compared to non-facial identity data of other preexisting users stored in the system 10.

The received and/or stored data (facial and non-facial) may be encoded, such as through encryption, hashing, etc., or otherwise converted so that it remains secure throughout its use. In one example, this data is converted and stored as hashes or other converted data blocks. The hashes or converted data created from the received user data can be compared to stored hashes or converted data of other preexisting users. In some embodiments, different combinations of identification data can be used to create a different hash or converted data block used for comparison purposes. For example, a hash or data block consisting of any one or more of a user's name, date of birth, address, or a combination of any two or more of these may be used in comparing similar hashes or data blocks of other users. Facial image data can also be converted and stored as hashes or other converted data. The facial image data can be full or partial facial image data.

The compared data of the user and preexisting users, which may be in the form of hashes or converted data, may be given different weights. For example, certain names (e.g., John Smith) may be very common so that the little weight may be given to names or particular names by themselves. It is also likely that many users will have the same birth date, so less weight may be given to a particular birth date. By using a combination of different data, however, such as name and birthdate, or name, birthdate and address, greater weight can be assigned to this criterion, as it is less likely that different people will have these things in common.

This may also be true of the facial image data. The facial image data of a user or portions thereof (e.g., features of eyes, nose, mouth, feature spacing, etc.) may be converted to hashes or converted data blocks that can be compared to stored hashes or converted data blocks of other preexisting users.

By using such methods, the data, which may be in a number of hashes or converted data blocks, can be compared. The number of similarities for each characteristic can be counted and weighted to provide a numerical representation of the confidence that the user is unique and not another preexisting user stored in the system database.

As shown in FIG. 10, the comparison operation 182 provides a score output 184 that relates to the confidence that the user is not the same person as a preexisting user stored in the system 10. The score output 184 will constitute a value that is measured against a selected baseline value or values.

As an example, if the score output 184 is below a selected baseline value C according to baseline determination step 186, the user is considered to be a new single unique user. An approval 188 is provided to approval determination operation 190 of FIG. 4. An output 192 of a verification result of approval of the user's request is provided on the user's computer or mobile device 28, 30, 32 according to 160. This results in the user to create an account or profile and allows the user access to the system 10 and/or any application that utilizes the system 10.

Upon approval determination in 190, any one or more of the collected images 104, 112, 130, 132, 134 and the collected and extracted non-facial identification data 114, 120 or portions thereof may be stored in the system 10, such as on one or more of the servers 14, 16 and/or data storage 18 (FIG. 1). Such data may be stored as encoded data, which may include encrypted data, hashes, etc., and/or converted data blocks, as previously discussed. This may then form part of the data of a database of preexisting users for future use in subsequent performances of the singularity process.

On the other hand, if in the determination step 186 it is determined that the score output 184 (FIG. 10) is at or above the baseline value C, a second determination step 194 is used based upon a selected baseline value D for the score 184. The baseline value D may be higher than the baseline value C. If the score output 184 is above the baseline value D, the user cannot be considered to be unique when compared to stored data of preexisting users. This results in the user a denial 196 that is provided to the denial determination operation 198 (FIG. 4) which provides a denial to the user as an output of a verification result in the form of the denial 158. This may be provided as a decision to the user that is displayed or otherwise provided on the user's computer or mobile device 28, 30, 32 according to 160. Upon the denial decision 198 any one or more of the collected images 104, 112, 130, 132, 134 or and the collected and extracted non-facial identification data 114, 120 or portions thereof may be deleted from the system 10. In other applications, all or some of this data may be stored or retained for various purposes. A notification may also be provided to the user that it appears they may already have an existing record or account set up. This may prompt the user to recall this fact so that this record or account may be used in lieu of the new one they are attempting to create.

If the score output 184 is above the baseline value C but at or below the selected baseline value D according to determination steps 186 and 194 (FIG. 10), the user facial image data is flagged or noted for manual review according to step 200 by a human operator of the system 10. The human operator will then review the collected user data as well as any similar preexisting user data that has been evaluated and determine if the user is a new single unique user or is a preexisting user. If the human operator determines that the user is a new unique user this information is provided to the approval determination step 190 as an approval. An output 192 of a verification result of approval of the user's request is provided on the user's computer or mobile device 28, 30, 32 according to 160. This results in the user being allowed to create an account or profile and allows the user access to the system 10 and/or any application that utilizes the system 10. Additionally, any one or more of the collected images 104, 112, 130, 132, 134 and the collected and extracted non-facial identification data 114, 120 or portions thereof may be stored in the system 10, as previously discussed.

If the human operator determines from the collected data from the user that the user is not a single unique user but appears to match another preexisting user and cannot be considered to be unique, this is received by the denial determination operation as a denial. An output of a verification result in the form of the denial 158 (FIG. 4) is then created. This may be provided as a decision to the user that is displayed or otherwise provided on the user's computer or mobile device 28, 30, 32 according to 160. Upon the denial 160 any one or more of the collected images 104, 112, 130, 132, 134 or and the collected and extracted non-facial identification data 114, 120 or portions thereof may be deleted from the system 10. In other applications, all or some of this data may be stored or retained for various purposes.

Alternatively, if the human operator determines that more information is needed to make a decision, the user may be prompted for further information according to prompting step 100 of FIG. 4. In this case, the process may be repeated or the new information submitted may be directly forwarded to the human operator for review. Based upon this additional information, the human operator may provide an approval, denial, or further request for information.

Figure 11:
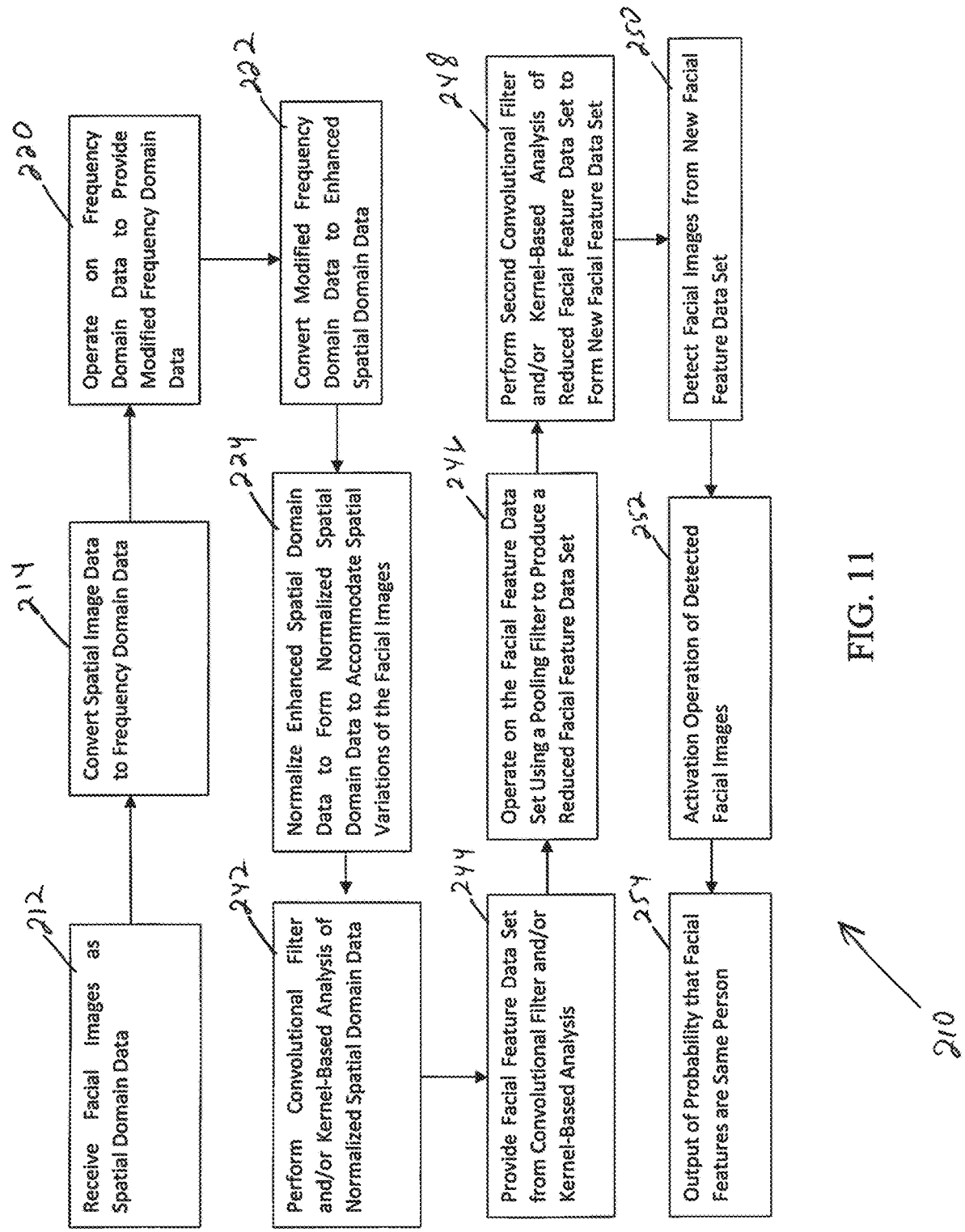
FIG. 11 is a flow diagram of the processing of the received facial image data in accordance with an illustrative embodiment.

Referring to FIG. 11, a process flow diagram 210 is shown for processing the received facial image data, such as the live facial image 106 (FIG. 5) and photographed facial images 110 in photos 104, 112, received from the user, as in step 102 (FIG. 4). The live facial image 106 and photographed facial images 110 is typically received as spatial domain image data in step 212. Such spatial domain image data includes those in image file formats, such as JPEG, PNG, TIFF, BMP, etc. It should be noted that the various data processing may be performed on one or more processors, with various portions of the data being processed simultaneously or sequentially.

Most signals are represented in the time domain, or in the case of images, the spatial domain (effectively, a 2-dimensional time domain). The time domain representation of a signal is the amplitude of the signal at a given point in time. In the spatial domain, this would be the pixel value or more accurately the brightness for a given color channel. Since images are made up of red, green, and blue color channels, there are three spatial representations corresponding to the images. If the image format supports opacity, or transparency, a fourth channel would also be used and would have a separate spatial domain representation.

The frequency domain is a different representation of the same underlying data. This encoding represents the data with respect to frequency rather than time. This is essentially a Fourier series (an infinite summation of harmonically related sinusoidal functions also known as harmonics) representation of the signal. In two dimensions, the representation is an infinite summation of complex exponentials of varying magnitudes, frequencies, and phases. The reason the frequency domain representation of a signal is used is that the mathematical analysis and computation for manipulating the signal can be simplified. For example, removing noise (the grainy part of an image that distorts the underlying content) can be a difficult process since there is no external information indicating the true representation of the image or the noise pattern. While this noise can be modeled using probability theory and statistical analysis (i.e., creating a probability density function representing the noise and setting it equal to the known source image minus the unknown true image), it is far easier to analyze it in the frequency domain. In the frequency domain, noise is often seen as a high frequency (especially in regard to the image analysis in the present application). Therefore, operating on the high frequency components can be a more effective noise reduction technique, while reducing computational overhead. In order to operate in the frequency domain, the image is converted from the spatial domain to the frequency domain. This can be accomplished through mathematical operators, such as a Fourier transform. Specifically, in the case of images where the data points are discrete, we use a two-dimensional discrete Fourier transform of Equation 1 below.

$$I(u, v) = \sum_{x=0}^{N_{cols}-1} \sum_{y=0}^{N_{rows}-1} I(x, y) e^{-i2\pi\left(\frac{xu}{N_{cols}} + \frac{yv}{N_{rows}}\right)} \quad (1)$$

Figure 12:
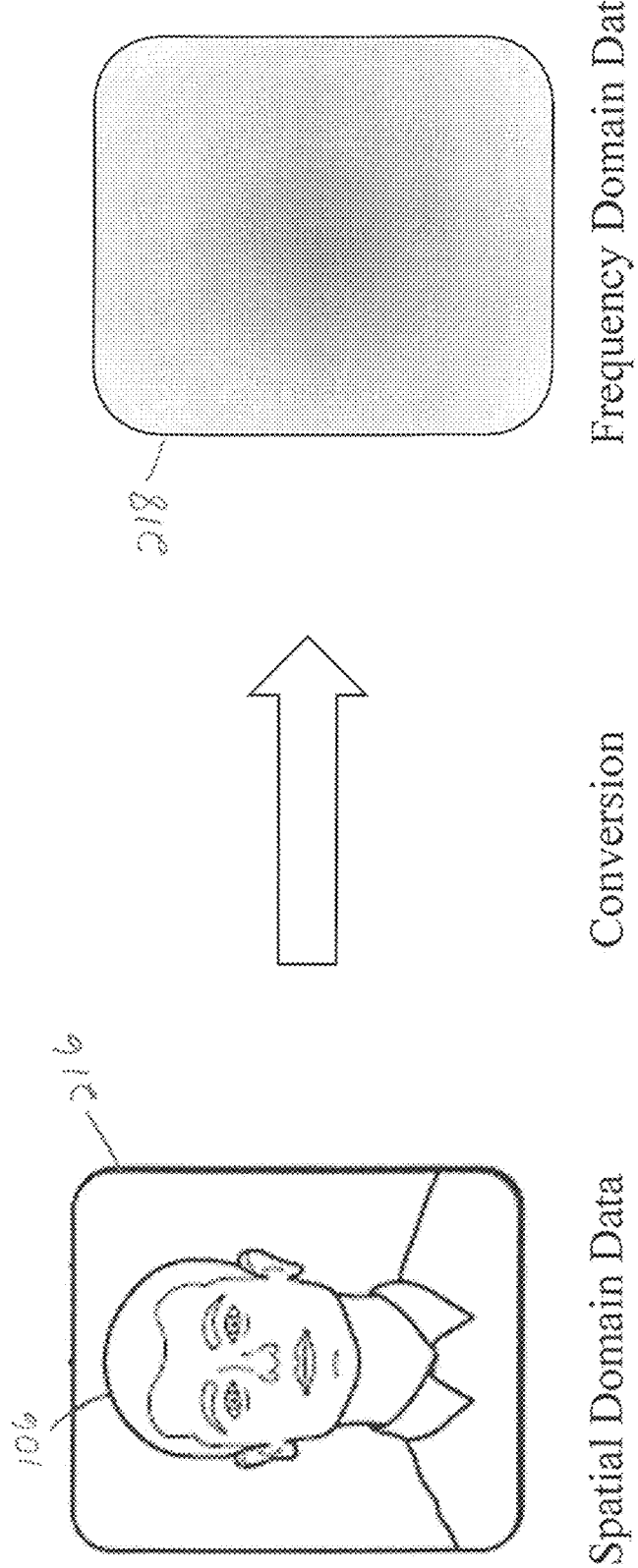
FIG. 12 is a schematic representation of the conversion of facial image data received as spatial domain data to frequency domain data, according to the process of FIG. 11.

The conversion of spatial image data to frequency domain data is shown in step 214 of FIG. 11. FIG. 12 shows a graphical depiction of image 106 presented as spatial domain data 216. This may be converted via Fourier transform to frequency domain data represented at 218. In the frequency domain 218, the lower frequency components are located near the center, while the higher frequency components are located around the periphery. Noise is typically found in the higher frequency domain. In processing, the various frequencies may be processed independently on one or more processors.

Step 220 shows the step of operating on the frequency domain data so that it is modified to provide modified frequency domain data. By modifying the frequency domain data, such as reducing the power of the higher frequencies, which may represent noise, while it is in the frequency domain, it simplifies the processing of the data and creates higher accuracy in analyzing the data to eliminate irrelevant content of the image.

This modified frequency domain data can then be reconverted back to spatial image data, according to step 222 to form new or enhanced spatial domain data. This may be accomplished with an inverse Fourier transform. Specifically, in the case of images where the points are discrete, a two dimensional inverse discrete Fourier transform can be used, such as shown in Equation 2 below.

$$I(x, y) = \frac{1}{N_{rows}N_{cols}} \sum_{u=0}^{N_{cols}-1} \sum_{v=0}^{N_{rows}-1} I(u, v) e^{-i2\pi\left(\frac{xu}{N_{cols}} + \frac{yv}{N_{rows}}\right)} \quad (2)$$

When converting to the frequency domain, each tuple of frequencies requires a computation for each pixel. A typical image with a smart phone is of 4K resolution. This means 8,294,400 different computations need to be performed. Since each calculation is independent it is highly parallelizable. From there, equations with millions of complex terms (mathematical complex referring to a complex number-real component and imaginary component). This equation needs to be simplified to reduce the complexity of future transformations. Simplification is a process of complex additions and fractional rebasing which typically requires special instructions not found in the standard ISA (Instruction Set Architecture) of a computer.

This conversion process needs to be performed for each frequency tuple of which there is an equivalent number of compared to pixels in the spatial representation. (e.g., 8,294, 400 for a 4 k image). For some images, patterns can be recognized and simplifications in the spatial representation can be made to reduce the computational load when converting to the frequency domain. This is rare, however, and not relevant for practical use as most images of people and faces do not possess repeating oscillatory patterns across the entire image.

This algorithm is $O(N^2)$ where N is the total number of input values and as such is typically inefficient to compute to the scale required in the present application. To accommodate for this, an algorithmic improvement, known as a Fast Fourier Transform and Inverse Fast Fourier Transform, respectively, may be used. These algorithms are $O(N \cdot \log(N))$, which is significantly faster to compute. The optimization that results from these fast variants of the algorithm provides the same result as the original algorithm (+a negligible amount of error) by factorizing the Discrete Fourier Transform Matrix into a product of sparse (mostly 0) factors. Although there are derivative algorithms, the traditional algorithm recursively breaks down a Discrete Fourier Transform (DFT) of any composite size $N=N_1N_2$ into many smaller DFTs of sizes $N_1$ and $N_2$ along with multiplications of complex roots of unity. These complex roots of unity are known as twidle factors. Additionally, this can be combined with other Fourier Transform algorithms to allow for mixed-radix Fourier Transforms where are the radix are $N_1$ and $N_2$.

In order to increase the accuracy of the downstream data processing, any differences between images may need to be corrected. This may include subject matter rotational and transformational differences, as well as other differences. Such differences may include an obstruction or distortion of one or more facial features. In the case of facial images, corrections to make the subject head orientation the same as the images used for comparison may be made. This is represented in step 224 where the enhanced spatial domain data from step 222 is normalized to form normalized spatial domain data to accommodation variations of the facial images, such as facial rotation along any one or more of the three axes of rotation. Such normalization alleviates the need to have the subject's face in the same or similar facial positions in the various images used for comparison.

When the images are received, the amount of data is fixed. The data cannot be recreated to form an image taken from the corrected/normalized orientation. In the normalization step, however, feature detection and feature matching can be utilized so that a decent replica of the image can be formed. In the process 210 of FIG. 11, the normalization 224 occurs utilizing the enhanced spatial domain data created in step 222.

In this context, features are pieces of information relevant for future computation tasks. These can be specific structures in the images, such as a point, edge, object, or a derivative indicator based on the general neighborhood of the image. These localized or key point features are often described by the appearance of groups of pixels surrounding the point locations. The representation of these key point features is a description that is ideally invariant to changes in illumination, translation, scale, and rotation. As such, if an image is modified in any of the listed ways, the detected feature would be identical between the two. The detected features can then be compared across images to determine similarities.

The feature point is expressive in texture and usually occurs at the boundary of an object in the image, i.e., when an abrupt perceptual change occurs. It may have a well-defined position in the spatial domain that is stable and could be reliably computed in a variety of conditions. The detected feature points should be readily determined. This may be determined in seconds or fractions of a second, even though trillions of operations may be occurring. Each feature point is accompanied by a feature vector which provides a unique "fingerprint" for the particular feature.

FIG. 13 shows an example of various key features with respect to images 226 and 228, which are each different facial images of the same individual. Image 226 is an image with a subject's head turned slightly to the subject's right, while image 228 is that of the same subject's head directly facing the camera. Non-limiting, representative corresponding key features 230, 232, 234, 236, 238, 240 of the subject are detected in each of the photos 226, 228. This may include the corners of the subject's mouth at 230, 232, the tip of the subject's nose 234, the corners of the subject's eyes 236, 238, and the top of the subject's ear 240. Other features may also be detected and used in the normalization step 224. A significant number of key features may be identified to carry out the normalization step.

Since the image descriptors or key features are ideally unique regardless of rotational and transformation differences, these can be matched between the images. Once the features are matched, an affine matrix may be formed to perform an affine transformation on one of the images. This transformation is geometric and preserves lines and parallelism, but not necessarily Euclidean distance and angles. The process of applying the derived affine transformation is called normalization because each image when compared in downstream processes is geometrically similar to the others.

Convolutional filter and/or kernel-based analysis is conducted in step 242 to facilitate detecting of the facial images. This convolutional filter and/or kernel-based analysis may be of one or both of the non-normalized enhanced spatial domain data from step 222 or the normalized spatial domain data from step 224. In most cases, convolutional filter and/or kernel-based analysis is applied to the normalized spatial domain data as it reduces the number of necessary convolutional filters applied and increases the accuracy of the output of related images.

Convolution is a mathematical operation of two functions that describe the influence of one function on the other. It is defined as the integral of the product of the two functions after one is reflected about the y-axis and shifted. Convolution possesses commutativity, as such, the result is the same regardless of which function is flipped. In respect to filters, one of the two functions is statically specified and the other is allowed to be a variable input. With this arrangement, the fixed function can be strategically specified to compute insights regarding the input signal. With respect to images (a two-dimensional input), the function can be represented as matrices in order to respect the positioning of the data relative to other pieces of data. It is important to maintain positioning as the ordering of the data in itself is data with significance. To compute the convolution, the matrices are multiplied together.

In the two-dimensional spatial domain, the fixed function is referred to as a "kernel," a linear algebra term representing the subspace of the domain that can be mapped to the zero vector. In the present application, the fixed function will fulfill the definition of a kernel. Additionally, the kernel will always be significantly smaller than the image in regard to dimensions (e.g., 4,096×4,096 input signal versus a 7×7 kernel). The input image is padded by surrounding the image in null data, to reduce data loss to the convolution process. The convolutional filters are made up of various sizes (always a square and an odd number greater than or equal to 3) and applied on various stride lengths (i.e., how many signals or, in the case of images, pixels that are skipped after each time of applying the convolutional filter).

The actual value of the kernel is application dependent. To detect a vertical line, horizontal line, a light versus dark boundary, etc., the definition of the kernel will differ. Additionally, the magnitude of the kernel component values relative to the kernel overall will vary given the intensity.

Moreover, for complex detections, the output of convolutional filters can be chained together, i.e., applying a convolutional filter to the output of a different convolutional filter. The output of the convolutional and/or kernel-based analysis of step 242 is a facial feature data set that is provided as step 244 in FIG. 11.

Applying convolutional filters, as in step 242, is an intensive process. In the present application, there may be many hundreds or thousands of convolutional filters applied to the source image. Additional convolutional filters may be chained to the output, repeatedly, (e.g., 10× times). To cope with the overwhelming computational complexity while maintaining accuracy, pooling filters may be interspersed between the convolutional filters. Pooling filters use a statistical notion, such as the average, max, min, or other value for a group of input values. A given input is applied to one instance of the pooling filter, i.e., the stride of the pooling filter is equivalent to its size. In the present application, the input is in the form of pixels. This has the effect of reducing the size of the source for subsequent computations, thus reducing its complexity. For example, a 2×2 pooling filter has an output a quarter the size of the input. This comes with a tradeoff in regard to accuracy, however. If performed strategically, this reduction in accuracy can be negligible in regard to the final result. The pooling filter operation of step 246 produces a reduced facial feature data set from which the facial features may then be detected.

In certain instances, a series of convolutional filter/pooling operations may be performed, as with the subsequent convolutional filter and/or kernel-based analysis of step 248, followed by one or more additional pooling filter steps and further convolutional filter steps (not shown), to further reduce the facial feature data to provide a new facial feature data set that is reduced. Facial features can thus be detected from this new facial feature data set according to step 250 with higher speed and reduced processing requirements.

While facial feature data output provided by the convolutional/pooling filter process, as previously described, can produce an output that facilitates detecting the facial images to determine similarities or non-similarities of facial features, it may be further processed in many cases. The detected facial image of step 250, can be operated on by an activation function, as shown in step 252. The activation function is typically a nonlinear mapping function that provides a desired output. In the present application, a non-saturating activation function may be used, which has the advantage of a unique output for a given input. This facilitates determining whether the detected facial feature data is similar or non-similar so that it can be determined whether or not the detected facial images of photos are of the same person. The activation function gives an indication of the probability that the detected facial images are of the same person. This is provided as an output at step 254 and can be used in the comparison step 130 of FIG. 6 to provide the baseline determination steps 146, 152.

While the processing steps of the flow diagram of FIG. 11 for processing the facial image data may be used, it should be understood that certain steps may be eliminated and/or the order of certain steps may be modified. For instance, in certain applications, one or more of the normalization step 224, pooling step 246, activation step 252 may be eliminated, while still performing the same function. This may result in higher levels of data processing requirements and inefficiencies in operation of the system, however.

By use of the user identity verification system and method described herein, only a single "real" user is allowed to set up an account or profile and allowed access to the system 10 and/or any application that utilizes the system 10. This prevents fake online identities from being created and prevents the creation of artificial users, such as "bot" accounts that interfere or disrupt legitimate online activities. The verification system and method also prevent the creation of multiple or redundant accounts by a single user.

The system and method also prevent unauthorized users from setting up accounts. For example, minors often attempt to set up accounts on restricted websites and social media by using false data, such as incorrect birth dates. The system and method would prevent minors from creating accounts or profiles because the minor's age can be determined from the photo ID. In certain cases, to comply with Children's Online Privacy Protection Act (COPPA) where minors may set an account, the system may require user information from the parent are guardian, which may be processed similarly as that described previously for the user, to ensure that the parent's or guardian's identity is verified.

Predatory adults may also try to set up an account to appear as a minor on certain sites, appropriating and using the facial image of minor. The system and method prevent this by ensuring that the facial image and non-facial data of user information is authentic and validated so fake facial images or false non-facial data, such as birthdates, cannot be used to set up an account.

The description of the present invention has been presented for purposes of illustration and description and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

We claim:

1. A computer-implemented system for verifying an identity of a user and preventing redundant user accounts, the system comprising:
   a processor, non-transitory memory, storage, an input, an output, and a busing architecture communicatively interconnecting the input, the output, the processor, the non-transitory memory, and the storage, the input configured to receive a signal from an external source, the output configured to forward a result signal to a display or audio device, the input and the output operable to communicate with a computing device through a communication link, and the non-transitory memory being accessible to the processor, the non-transitory memory including processor-executable instructions, that, when executed cause the system to:
   receive a request from the user via the communication link from the computing device to create a new user account;
   receive data from the user through via the communication link from the computing device that comprises a first digital photo captured with a camera of the computing device containing both a live facial image of the user and an identification document that contains a photographed facial image and non-facial identifying data, the first digital photo being initially received as spatial domain data;
   convert the spatial domain data to frequency domain data and operating on frequency domain data to provide a modified frequency domain data to facilitate data processing;
   convert the modified frequency domain data to enhanced spatial domain data;
   detect facial images from the enhanced spatial domain data of the first digital photo and recognize the non-facial identifying data from the enhanced spatial domain data of the first digital photo;
   correlate the detected facial images of the first digital photo and determine whether the facial images are of the same person;
   refuse creation of the new user account in response to the detected facial images in the first digital photo being dissimilar below a predetermined threshold;
   refuse creation of the new user account in response to the recognized non-facial identifying data being deemed as invalid by a third-party verification entity;
   refuse creation of the new user account in response to the recognized non-facial identifying data being compared to preexisting identity verification data associated with a plurality of existing user accounts, the recognized non-facial identifying data being selected from a group consisting of: name, birthdate, address, place of birth, driver's license number, fingerprint, state ID number, social security number, passport number, department of defense (DoD) ID number, and government employee ID number, where the comparison results indicative of the recognized non-facial identifying data being identical to at least one of preexisting stored data associated with at least one of the plurality of existing user accounts; and
   refuse creation of the new user account in response to the detected facial images of the first digital photo being compared to preexisting stored facial images associated with a plurality of existing user accounts, where the comparison results indicative of the detected facial images of the first digital photo being associated with at least one existing user account.

2. The system of claim 1, wherein executing the processor-executable instructions further causes the system to:
   upon determining at least one of (1) that the facial images are not of the same person during correlation by the system of the detected facial images of the first digital photo; (2) that the recognized non-facial identifying data is not the same as non-facial identifying data of the third-party verification entity during verification with the system; and (3) that the user is not unique during comparison of the received data from the user to preexisting stored data by the system, deleting or removing at least a portion of the received data from the system.

3. The system of claim 1, wherein executing the processor-executable instructions further causes the system to:
   comparing the received data from the user to preexisting stored data of existing user accounts is only performed upon determining that the facial images in the first digital photo are of the same person and the non-facial identifying data is valid according to the comparison of the recognized non-facial identifying data to the preexisting identity verification data.

4. The system of claim 1, wherein:
   the received data from the user further comprises an enhanced photo of the identification document of the first digital photo that contains the photographed facial image, the enhanced photo of the identification document facilitating discernment of features contained in the identification document; and wherein
   detecting the facial images comprises detecting the facial images from the first digital photo and the enhanced photo; and correlating the detected facial images comprises correlating the detected facial images of the first and enhanced photos and determining whether the facial images are of the same person.

5. The system of claim 1, wherein: the recognized non-facial identifying data comprises at least one of printed text, a barcode, a linear bar code, a stacked linear barcode, a 2D barcode, and a PDF417 barcode.

6. The system of claim 1, wherein executing the processor-executable instructions further causes the system to:
transmit, via the communication link to the computing device of the user, and display a response to the request to create the new user account consistent with results from verifying and comparing the facial images and non-facial identifying data.

7. The system of claim 1, wherein executing the processor-executable instructions further causes the system to:
assign a weight value to each element of the recognized non-facial identifying data;
compare each element of the recognized non-facial identifying data to elements of the pre-existing identity verification data associated with the plurality of existing user accounts;
determine a confidence score in response to the comparison and the weight values; and
refuse creation of the new user account in response to the confidence score indicative of the user is associated with at least one existing user account.

8. The system of claim 1, wherein executing the processor-executable instructions further causes the system to determine a probability that the facial images in the first digital photo are of the same person.

9. The system of claim 1, wherein executing the processor-executable instructions further causes the system to receive and process a video containing a live facial image of the user and the identification document.

10. A method for verifying an identity of a user for the purpose of preventing duplicate accounts for any user implemented on a computer system, the method comprising:
receiving a request from the user via the communication link from a computing device to create a new user account;
receiving data from the user through the communication link from the computing device that comprises a first digital photo captured with a camera of the computing device containing both a live facial image of the user and an identification document that contains a photographed facial image and non-facial identifying data, the first digital photo being initially received as spatial domain data;
converting the spatial domain data to frequency domain data and operating on the frequency domain data to provide a modified frequency domain data output to facilitate data processing;
converting the modified frequency domain data output to enhanced spatial domain data;
detecting facial images from the enhanced spatial domain data of the first digital photo and recognizing non-facial identifying data from the enhanced spatial domain data of the first digital photo;
correlating the detected facial images of the first digital photo and determining whether the facial images are of the same person;
refusing creation of the new user account in response to the detected facial images in the first digital photo being dissimilar below a predetermined threshold;
refusing creation of the new user account in response to the recognized non-facial identifying data being compared to preexisting identity verification data associated with existing user accounts, the recognized non-facial identifying data being selected from a group consisting of: name, birthdate, address, place of birth, driver's license number, fingerprint, state ID number, social security number, passport number, department of defense (DoD) ID number, and government employee ID number, where the comparison results indicative of the recognized non-facial identifying data being identical to at least one of preexisting stored data associated with at least one existing user account; and
refusing creation of the new user account in response to the detected facial images of the first digital photo being compared to one preexisting stored facial images associated with existing user accounts, where the comparison results indicative of the detected facial images of the first digital photo being associated with at least one existing user account.

11. The method of claim 10, further comprising:
upon determining at least one of (1) that the facial images are not of the same person during correlation by the computer system of the detected facial images of the first digital photo; (2) that the recognized non-facial identifying data is not the same as non-facial identifying data of a verification entity during verification with the computer system; and (3) that the user is not unique during comparison of the received data from the user to preexisting stored data by the computer system, deleting or removing at least a portion of the received data from the computer system.

12. The method of claim 10, further comprising:
comparing the received data from the user to preexisting stored data of existing user accounts is only performed upon determining that the facial images in the first digital photo are of the same person and the non-facial identifying data is valid according to the comparison of the recognized non-facial identifying data to the preexisting identity verification data.

13. The method of claim 10, wherein:
the received data from the user further comprises an enhanced photo of the identification document of the first digital photo that contains the photographed facial image, the enhanced photo of the identification document facilitating discernment of features contained in the identification document; and wherein
detecting the facial images comprises detecting the facial images from the first digital photo and the enhanced photo; and
correlating the detected facial images comprises correlating the detected facial images of the first and enhanced photos and determining whether the facial images are of the same person.

14. The method of claim 10, further comprising:
generating and transmitting an output via the communication link to the computing device of the user and refusing setting up the new user account upon a determination of at least one of (1) the received data from the user corresponds to preexisting stored data of a user, (2) the facial images in the first digital photo are not of the same person, and (3) the non-facial identifying data is not valid.

15. A non-transitory computer-readable medium having encoded thereon instructions for execution by a computer, wherein the instructions comprise a method of maintaining integrity of user accounts for an online community, comprising:

receiving a request from a user via communication link from a computing device to create a new user account on the online community;

receiving user data including identity data entered by the user, and at least one captured image including a first facial image of the user and an image of a government issued identification document including a second facial image of the user;

processing and analyzing the received user data comprising:

detecting the first and second facial images in the at least one captured image;

comparing the first and second facial images of the user in the at least one captured image and refusing creation of the new user account in response to the first and second facial images not being of the same person;

recognizing non-facial identifying data as a part of the image of the government issued identification document, the non-facial identifying data being selected from a group consisting of: name, birthdate, address, place of birth, driver's license number, fingerprint, state ID number, social security number, passport number, department of defense (DoD) ID number, and government employee ID number;

comparing the recognized non-facial identifying data with the user entered identity data and refusing creation of the new user account in response to a mismatch of the recognized non-facial identifying data and the user entered identity data;

verifying the recognized non-facial identifying data with a third-party verification entity and refusing creation of the new user account in response to the non-facial identifying data being invalid; and comparing the recognized non-facial identifying data to preexisting stored non-facial identifying data associated with a plurality of existing user accounts of the online community and the recognized non-facial identifying data matching at least a portion of the preexisting stored non-facial identifying data associated at least one of the plurality of existing user accounts; and generating a response to the user request for presentation to the user on the computing device, the response being consistent with results from the verifying step and comparing steps.

16. The non-transitory computer-readable medium of claim 15, further comprising:

assigning a weight value to each element of the recognized non-facial identifying data;

comparing each element of the recognized non-facial identifying data to elements of pre-existing identity verification data associated with existing user accounts;

determining a confidence score in response to the comparison and the weight values; and refusing creation of the new user account in response to the confidence score indicative of the user being associated with at least one existing user account.

17. The non-transitory computer-readable medium of claim 15, further comprising determining a probability that the first and second facial images in the captured image are of the same person.

18. The non-transitory computer-readable medium of claim 15, wherein receiving additional user data comprises receiving a video containing a live facial image of the user and the identification document.

* * * * *